(12) United States Patent
Koyama

(10) Patent No.: US 8,998,088 B2
(45) Date of Patent: Apr. 7, 2015

(54) TOKEN STORAGE DEVICE

(71) Applicant: Universal Entertainment Corporation, Tokyo (JP)

(72) Inventor: Toshimi Koyama, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 14/217,592

(22) Filed: Mar. 18, 2014

(65) Prior Publication Data

US 2014/0291399 A1    Oct. 2, 2014

(30) Foreign Application Priority Data

Apr. 1, 2013  (JP) ................. 2013-076489

(51) Int. Cl.
| | | |
|---|---|---|
| *G06K 7/00* | (2006.01) | |
| *G06K 7/10* | (2006.01) | |
| *G06K 19/077* | (2006.01) | |
| *H01Q 1/22* | (2006.01) | |

(52) U.S. Cl.
CPC ........ *G06K 7/10019* (2013.01); *G06K 7/10336* (2013.01); *G06K 19/07796* (2013.01); *H01Q 1/22* (2013.01)

(58) Field of Classification Search
USPC .......................... 235/439, 375, 487; 273/309
See application file for complete search history.

(56) References Cited

U.S. PATENT DOCUMENTS

| | | | |
|---|---|---|---|
| 2009/0075723 A1* | 3/2009 | Richard et al. | 463/25 |
| 2010/0093428 A1* | 4/2010 | Mattice et al. | 463/25 |
| 2012/0080845 A1 | 4/2012 | Emori | |
| 2012/0100901 A1* | 4/2012 | Kirsch | 463/11 |
| 2013/0296041 A1 | 11/2013 | Emori | |

* cited by examiner

*Primary Examiner* — Edwyn Labaze
(74) *Attorney, Agent, or Firm* — Lexyoume IP Meister, PLLC

(57) ABSTRACT

Provided is a chip tray which is capable of accurately reading out an IC tag for use in RFID without increasing a magnitude of a magnetic field generated by an antenna. A magnetic field generating antenna is disposed along a direction in which a plurality of tokens having embedded therein feeder antennas of IC tags for use in RFID are stacked.

3 Claims, 18 Drawing Sheets

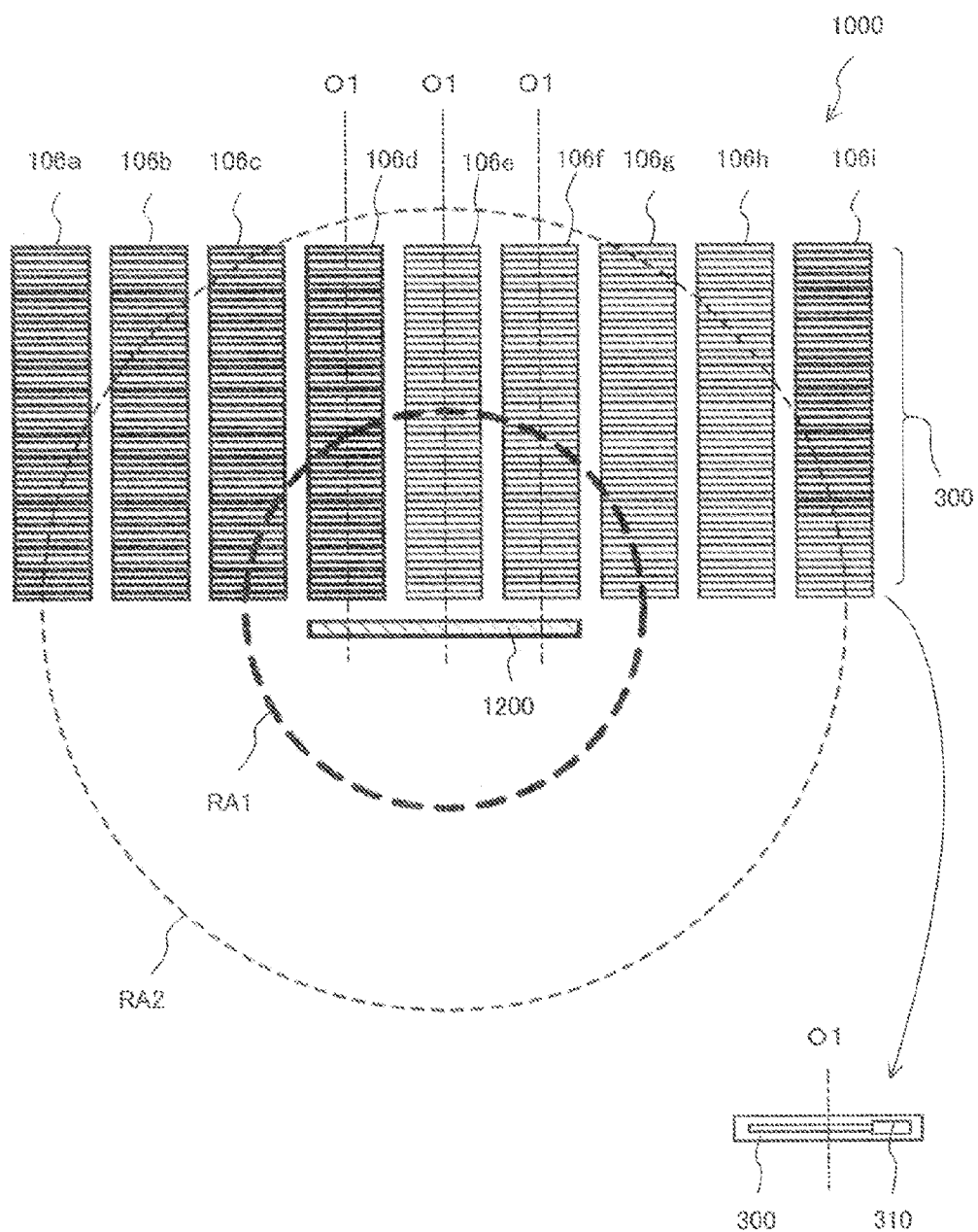

TOKEN STORAGE DEVICE

CROSS REFERENCE TO RELATED APPLICATIONS

This application claims priority of Japanese Patent Application No. 2013-076489 filed on Apr. 1, 2013. The contents of this application are incorporated herein by reference in their entirety.

BACKGROUND OF THE INVENTION

1. Field of the Invention

The present invention relates to a token storage device for storing tokens such as gaming chips used in a casino or the like.

2. Description of the Background Art

Conventionally, in a casino or the like, in order to identify gaming chips, used are gaming chips, each of which has an IC tag for use in RFID embedded therein. By reading the IC tag for use in RFID, each of the gaming chips can be identified and managed. Therefore, in a casino table, antennas for reading IC tags for use in RFID are provided.

Furthermore, it is desired not only to manage the gaming chips placed on the casino table but also to manage the gaming chips in a state where the gaming chips are stored in a chip tray. Therefore, there may be a case where the chip tray has antennas embedded therein. Also in a case where the chip tray has the antennas embedded therein, as with the casino table, the antennas are provided in the vicinity of a plurality of gaming chips stored therein. Magnetic fields generated by the antennas penetrate through the gaming chips stored in the chip tray and develop electromotive force onto the IC tags for use in RFID. Thus, identification information of each of the gaming chips stored in the chip tray also can be detected (for example, refer to United State Patent Application Publication No. 2012/0080845 and United State Patent Application Publication No. 2013/0296041).

The range in which the magnetic field generated by an antenna covers is determined depending on a shape of the antenna and a strength of an electromagnetic wave outputted from the antenna. Therefore, if a distance between the IC tag for use in RFID and the antenna is longer than a predetermined distance in accordance with a sensitivity of the IC tag for use in RFID, the electromotive force to drive the IC tag for use in RFID comes not to be developed. Therefore, it is difficult to read out a variety of pieces of information such as identification information of the IC tag for use in RFID.

As described above, even if the distance between the IC tag for use in RFID and the antenna is long, by making a size of the antenna larger or making the strength of the electromagnetic wave outputted from the antenna stronger, a scope in which the magnetic field generated by the antenna covers can be expanded. Thus, it is made possible to read out the identification information and the like of the IC tag for use in RFID away from the antenna. However, a scope in which the magnetic field covers expands in each direction of three-dimensional x-y-z directions. Therefore, even if it is desired to read out identification information of only gaming chips in the first row stored in a chip tray, it is highly likely to read out identification information of gaming chips in rows in the vicinity of the gaming chips in the first row.

In addition, when in a chip tray in which IC tags for use in RFID are stored, reading of a plurality of antennas is conducted, assumed is a case where the same one IC tag for use in RFID is read out repeatedly by the plurality of antennas, thereby leading to a problem in that a reading speed may be reduced. Furthermore, when a multitude of IC tags for use in RFID are read out by one antenna, also assumed is a case where the multitude of IC tags for use in RFID simultaneously respond to a reading command of a reader, thereby leading to a problem in that IC tags for use in RFID in positions, for which reading-out is not desired, are read out and hence, a reading speed may be reduced.

Therefore, in view of the above-described problems, the present invention was made. An object of the present invention is to provide a token storage device which is capable of accurately reading out IC tags for use in RFID without increasing a magnitude of each of the magnetic fields generated by the antennas.

SUMMARY OF THE INVENTION

A token storage device according to an embodiment of the present invention includes:

a storage part for storing in a stacked manner a plurality of tokens having feeder antennas of IC tags for use in RFID embedded therein; and a magnetic field generating antenna being disposed along a direction in which the tokens are stacked so as to develop electromotive force by exerting a magnetic field on each of the feeder antennas.

Since each of the magnetic field generating antennas is disposed along the direction in which the tokens are stacked, the magnetic field can be exerted on any of the feeder antennas of the tokens stored in any positions of the storage part. By this magnetic field, the electromotive force for driving the IC tags for use in RFID can be developed. Therefore, without increasing the magnitude of the magnetic field generated from each of the magnetic field generating antennas, the IC tag for use in RFID of each of the tokens stored in the storage part in the stacked manner can be driven. Accordingly, it becomes unnecessary to widen a range in which the magnetic field generated by the magnetic field generating antenna is exerted, thereby preventing IC tags for use in RFID in positions, for which reading-out is not desired, from being driven. Thus, reading out the IC tags for use in RFID in positions, for which the reading-out is not desired, can be prevented and a reading speed can be thereby increased.

In addition, in the token storage device according to the embodiment of the present invention, a part of each coiling part of the magnetic field generating antenna for generating the magnetic field by coiling an electric current is disposed in parallel with a part of a coiling part of the feeder antenna so as to face the part of the coiling part of the feeder antenna.

The part of each coiling part for generating the magnetic field by coiling the electric current of the magnetic field generating antenna is disposed in parallel with the part of the neighboring coiling part of the feeder antenna so as to face the part of the neighboring coiling part of the feeder antenna. Therefore, the magnetic field generated from each of the magnetic field generating antennas can be accurately exerted on each of the feeder antennas. Accordingly, it is only required to generate from each of the magnetic field generating antennas a magnetic field having a minimum magnitude for developing the electromotive force needed to drive each of the IC tags for use in RFID. Without increasing the magnitude of the magnetic field generated by each of the magnetic field generating antennas, the electromotive force needed to drive each of the IC tags for use in RFID can be generated also in each of the feeder antennas of the tokens stored in any positions of the storage part.

Furthermore, in the token storage device according to the embodiment of the present invention, a storage bottom face of the storage part for storing the plurality of tokens in the stacked manner is formed so as to be inclined.

The storage bottom face of the storage part is formed so as to be inclined. More preferably, the storage bottom face is formed so as to be inclined with respect to a horizontal direction. Therefore, when the tokens are placed in the storage part, the tokens can be displaced so as to move toward a given direction by the action of gravity. Accordingly, when the plurality of tokens are placed in the storage part, the plurality of tokens can be placed so as to be naturally stacked in the storage part and the plurality of tokens can be stored in the stacked manner, with the plurality of tokens having regular postures.

Furthermore, in the token storage device according to the embodiment of the present invention, a plurality of the coiling parts of the magnetic field generating antenna are disposed in the direction in which the tokens are stacked, and a distance between neighboring coiling parts of the magnetic field generating antenna is larger than a distance between the feeder antennas embedded in the tokens, with the feeder antennas being stacked.

By means of the above-described configuration, when the plurality of tokens are stored in the stacked manner in the storage part, the magnetic field generated from each of the magnetic field generating antennas can be exerted on each of the feeder antennas of the plurality of tokens disposed in any positions, and desired electromotive force can be developed for any of the plurality of tokens.

Hence, without increasing a magnitude of each of the magnetic fields generated by the antennas, IC tags for use in RFID in any positions, for which the reading-out is desired, can be accurately read out.

BRIEF DESCRIPTION OF THE DRAWINGS

FIG. 18 is a schematic view illustrating an outline of the conventional chip tray 1000.

DESCRIPTION OF THE PREFERRED EMBODIMENTS

Hereinafter, embodiments of the present invention will be described with reference to the accompanying drawings.

<<<<Outline of Token Storage Device 10>>>>

Figure 1:
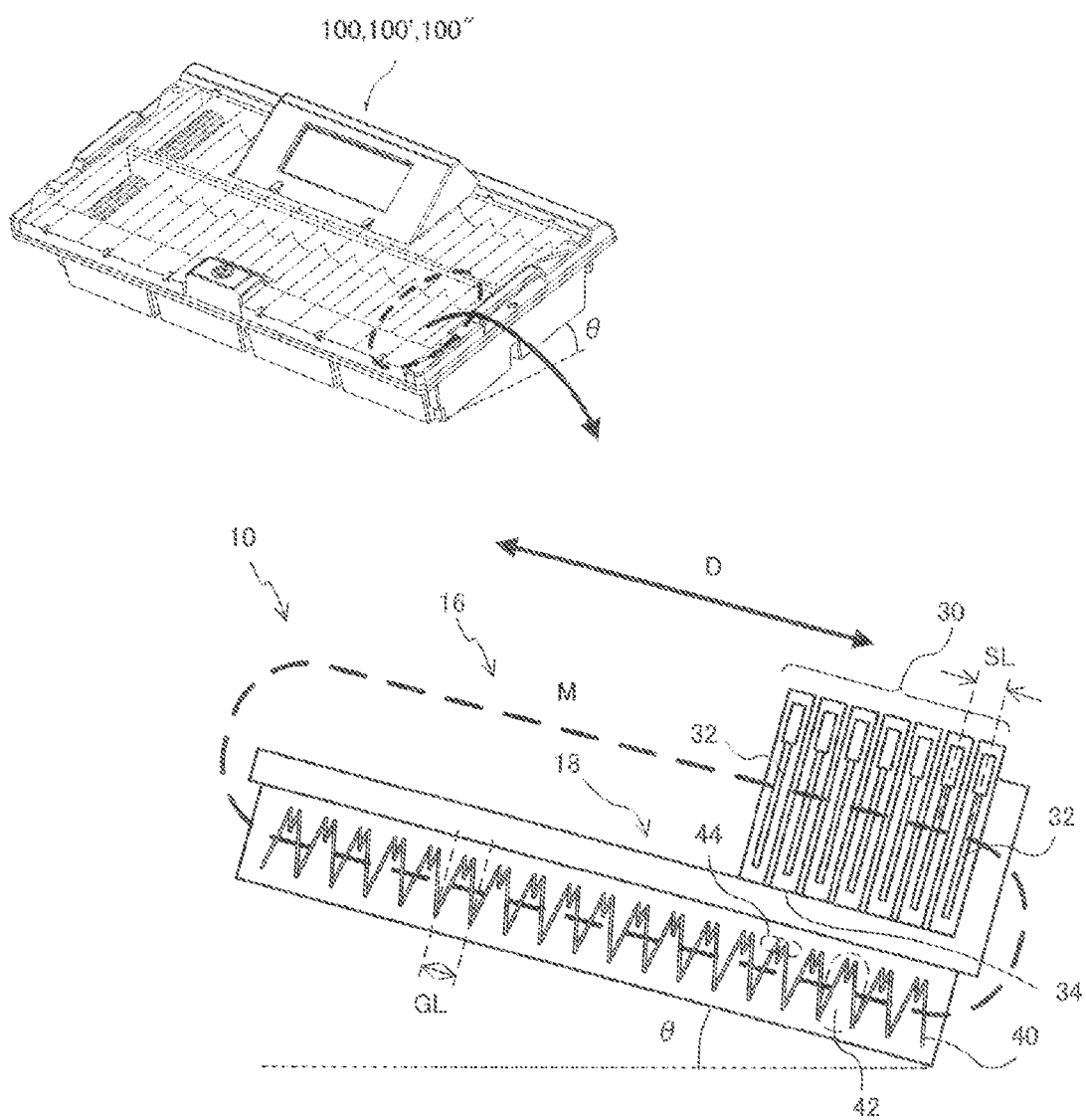
FIG. 1 is a schematic view showing an outline of a token storage device according to the present invention.

FIG. 1 is a diagram illustrating an outline of a token storage device 10 according to the present invention. FIG. 1 is a schematic view, and a specific configuration of the token storage device 10 is illustrated in FIG. 2 and the subsequent drawings.

As shown in FIG. 1, the storage device 10 (for example, the later-described chip tray 100, 100', or 100'', or the like) for tokens 30 (for example, the later-described gaming chips 300, or the like), according to the embodiment of the present invention includes:

storage parts 16 (for example, the later-described chip juxtaposing parts 108, or the like) for storing in a stacked manner a plurality of tokens 30, each of which has a feeder antenna 32 of an IC tag for use in RFID embedded therein (for example, the later-described antenna 310, or the like); and magnetic field generating antennas 40 (for example, the later-described antennas 200 or 600, or the like) disposed along a direction in which the tokens are stacked, such that a magnetic field is exerted on the feeder antennas 32 to develop electromotive force.

The storage device 10 for storing the tokens 30 according to the embodiment of the present invention includes; the storage parts 16 and the antennas 40. The tokens 30 are stored in the token storage device 10.

Each of the tokens 30 has the IC tag for use in RFID and the feeder antenna 32. The IC tag for use in RFID stores a variety of pieces of information such as identification information. The feeder antenna 32 generates the electromotive force needed to drive the IC tag for use in RFID by the action of the magnetic field. The magnetic field exerted on the feeder antennas 32 is generated by the later-described magnetic field generating antenna 40.

Each of the magnetic field generating antennas 40 is disposed along a direction D in which the tokens 30 are stacked. For example, each of the antennas 40 is disposed along a side face of each of the juxtaposing parts 18 on the periphery thereof. It is only required that the periphery of the side face of each of the juxtaposing parts 18 is the periphery of any side face of each of the juxtaposing parts 18. For example, in a case where each of the juxtaposing parts 18 has a columnar shape, the side face of each of the juxtaposing parts 18 is a face except two bottom faces of the columnar shape. In this case, the two bottom faces of the columnar shape serve as two storage end portions (for example, the later-described first storage end portion 110 and second storage end portion 112, or the like).

The periphery of the side face of each of the juxtaposing parts 18 may be either a portion including the side face of each of the juxtaposing parts 18 or a portion not including the side face of each of the juxtaposing parts 18. Accordingly, each of the antennas 40 may be provided on the side face of each of the juxtaposing parts 18, or each of the antennas 40 may be provided so as to be away from the side face of each of the juxtaposing parts 18.

Each of the magnetic field generating antennas 40 exerts the magnetic field on the feeder antenna 32 and thereby generates the electromotive force. For example, each of the magnetic field generating antennas 40 generates the magnetic field so as to allow magnetic field lines to penetrate through the feeder antenna 32 of each of the tokens 30 placed in each of the juxtaposing parts 18. Each of the magnetic field generating antennas 40 generates the magnetic field which allows the magnetic field lines M to penetrate through the feeder antennas 32 and to coil therethrough. Preferably, each of the magnetic field generating antennas 40 generates the magnetic field such that the magnetic field lines M penetrate through the feeder antennas 32 of the tokens 30 placed in each of the juxtaposing parts 18 in a stacked manner with regular postures. More preferably, each of the magnetic field generating antennas 40 generates the magnetic field which is substantially perpendicular to each of the feeder antennas 32 of the plurality of tokens 30 placed in each of the juxtaposing parts 18 in the stacked manner with the regular postures.

As described above, the magnetic field perpendicularly traverses the feeder antennas 32 of the tokens 30, thereby allowing a magnetic flux having a maximum magnetic flux density per unit area to penetrate through the feeder antennas 32 and thus allowing the electromotive force of the feeder antennas 32 to be maximized. By this electromotive force, the IC tag for use in RFID of each of the tokens 30 can be sufficiently driven. In addition, even if a traversing magnetic flux penetrates through the feeder antennas 32 at a certain angle in an oblique direction, it does not occur that no electromotive force is developed. It merely occurs that the magnetic flux is reduced in accordance with a projected area viewed from a plane which is perpendicular to the magnetic flux, thereby decreasing the electromotive force. By generating a sufficiently strong magnetic field from each of the magnetic field generating antennas 40, the IC tag for use in RFID can be driven by the electromotive force of each of the feeder antennas 32.

Since each of the magnetic field generating antennas 40 is disposed along the direction in which the tokens 30 are stacked, the magnetic field can be exerted on any of the feeder antennas 32 of the tokens 30 stored in any positions of the storage part 16. By this magnetic field, the electromotive force for driving the IC tags for use in RFID can be developed. Therefore, without increasing the magnitude of the magnetic field generated from each of the magnetic field generating antennas 40, the IC tag for use in RFID of each of the tokens stored in the storage part in the stacked manner can be driven. Accordingly, it becomes unnecessary to widen a range in which the magnetic field generated by the magnetic field generating antenna is exerted, thereby preventing IC tags for use in RFID in positions, for which reading-out is not desired, from being driven. Thus, reading out the IC tags for use in RFID in positions, for which the reading-out is not desired, can be prevented and a reading speed can be thereby increased.

In addition, preferably, each of the magnetic field generating antennas 40 generates the magnetic field such that the magnetic field lines travel along each of the juxtaposing parts 18 in each of the juxtaposing parts 18. Specifically, it is preferable that each of the magnetic field generating antennas 40 generates the magnetic field which coils around the whole of each of the juxtaposing parts 18. More preferably, each of the magnetic field generating antennas 40 generates the magnetic field so as to allow the magnetic field lines M traveling along a direction D, in which the tokens 30 are juxtaposed, to be formed. Thus, all of the IC tags for use in RFID of the plurality of tokens 30 placed in each of the juxtaposing parts 18 in the stacked manner can be read out.

In addition, as shown in FIG. 1, in the storage device 10 for storing the tokens 30 according to the embodiment of the present invention, a coiling part 34 (for example, the later-described coiling part 318 or the like) of each of the feeder antennas 32 and one portion 44 (for example, the later-described facing part 204 and facing part 604 or the like) of a coiling part 42 (for example, the later-described unit antennas 202 and 602 or the like) for generating the magnetic field by allowing an electrical current of the magnetic field generating antenna 40 to pass are disposed in parallel with each other so as to face each other.

As shown in FIG. 1, the one portion 44 of the coiling part 42 of each of the magnetic field generating antennas 40 is disposed in parallel with and so as to face the coiling part 34 of each of the feeder antennas 32. In other words, at least one portion of the coiling part of each of the magnetic field generating antennas is disposed in parallel with and so as to face the coiling part 34 of each of the feeder antennas 32. Here, the one portion 44 of the coiling part 42 is a short portion with respect to the whole of each of the magnetic field generating antennas 40, and it is only required that the one portion 44 of the coiling part 42 is disposed substantially in parallel with the coiling part 34 of each of the feeder antennas 32. This disposition will be described later in greater detail with reference to FIG. 7.

Therefore, the magnetic field generated from each of the magnetic field generating antennas 40 can be accurately exerted on each of the feeder antennas 32. Accordingly, it is only required to generate from each of the magnetic field generating antennas 40 a magnetic field having a minimum magnitude for generating electromotive force needed to drive each of the IC tags for use in RFID. Without increasing the magnitude of the magnetic field generated by each of the magnetic field generating antennas 40, the electromotive force needed to drive each of the IC tags for use in RFID can be generated also in each of the feeder antennas 32 of the tokens 30 stored in any positions of the storage part 16.

By adjusting a shape and a size of each of the magnetic field generating antennas 40, the magnetic field generated by the whole of each of the magnetic field generating antennas 40 can be of a desired magnitude. Furthermore, as the magnetic field generating antennas 40, magnetic field generating antennas 40 each formed by arranging a plurality of coiling parts 42 in a neighboring manner are preferable. It is more preferable that each of the magnetic field generating antennas 40 has a substantially helical shape. By adjusting each space respectively between the neighboring coiling parts 42, the magnetic field generated by the whole of each of the antennas 40 can be made so as to be of a desired magnitude. The magnetic field which is not exerted on any positions away from the position of each of the magnetic field generating antennas 40 and can generate the electromotive force needed to drive each of the IC tags for use in RFID can be generated.

Preferably, each of the coiling parts 42 includes a facing part (for example, the later-described facing part 204 and a facing part 604 or the like) and a connecting part (for example, the later-described connecting part 206 and a connecting part 606 or the like). The facing part constitutes the one portion 44 of each of the coiling parts 42 (hereinafter, referred to as a facing part). The facing part is disposed so as to be positioned toward each of the juxtaposing parts 18 (so as to face each of the juxtaposing parts 18). It is more preferable that the facing part is disposed so as to be positioned toward each of the juxtaposing parts 18 (so as to face each of the juxtaposing parts 18) and is disposed on a plane substantially perpendicular to the juxtaposition direction D in which the tokens 30 are juxtaposed.

Each of the connecting parts electrically connects the neighboring facing parts, respectively. The connecting parts are disposed in positions more away from the juxtaposing parts 18 than the facing parts are away therefrom. More preferably, the connecting parts are disposed in the positions more away more from the juxtaposing parts 18 than the facing parts are away therefrom and so as to face the juxtaposing parts 18.

One coiling part 42 is formed by one facing part and one connecting part. A unit coiling shape is formed by one coiling part 42. More specifically, it is preferable that one turn (one spire) of the substantially helical shape is formed by the one facing part and the one connecting part. The magnetic field is generated by the electric current passing through each of the coiling parts 42.

The magnetic field is generated from the antenna 40 by the electric current flowing through the coiling parts 42 of each of the antennas 40 in a direction in which the electric current flows and rotates (refer to the later-described FIG. 8). These magnetic fields are superimposed, thereby allowing the magnetic field along the juxtaposition direction D (refer to FIG. 1) in which the tokens 30 are juxtaposed to be generated. The magnetic fields to be formed will be described later with reference to FIG. 8.

Preferably, each of the coiling parts 42 has a bending part formed by bending a lead wire. Via the bending part, each of the facing parts and each of the connecting parts are electrically connected.

Furthermore, as shown in FIG. 1, in the token storage device 10 according to the embodiment of the present invention, a storage bottom face (for example, the later-described chip juxtaposing face 120 or the like) of the storage part (for example, the later-described chip juxtaposing part 108 or the like) for storing the plurality of tokens in the stacked manner is formed so as to be inclined.

The storage bottom face of the storage part 16 of the token storage device 10 is formed so as to be inclined. More preferably, the storage bottom face is formed so as to be inclined at an angle θ with respect to a horizontal direction. Therefore, when the tokens are placed in the storage part 16, the tokens 30 can be displaced so as to move toward a given direction by the action of gravity. Accordingly, when the plurality of tokens 30 are placed in the storage part 16, the plurality of tokens 30 can be placed so as to be naturally stacked in the storage part 16 and the plurality of tokens 30 can be stored in the stacked manner, with the plurality of tokens 30 having the regular postures.

Further, as shown in FIG. 1, in the storage device 10 for storing the tokens 30 according to the embodiment of the present invention, the plurality of coiling parts 42 (for example, the later-described unit antennas 202 and 602 or the like) of each of the magnetic field generating antennas 40 are disposed in the stacking direction (for example, a stacking direction D), and each space (for example, a space GL) of the neighboring coiling parts 42 of each of the magnetic field generating antennas 40 is larger than each space (for example, a space SL) between the feeder antennas 32, each of which is embedded in each of the tokens 30.

As shown in FIG. 1, the plurality of coiling parts 42 of each of the magnetic field generating antennas 40 are disposed along the stacking direction D. The plurality of coiling parts 42 are mutually connected along the stacking direction D, and each of the magnetic field generating antennas 40 is thereby formed. At this time, the space between the neighboring coiling parts 42 is the space GL.

The plurality of tokens 30 are stored in the stacked manner in the storage part 16. At this time, a space between the neighboring tokens 30 is a space SL, and a space between the feeder antennas 32 of the neighboring tokens 30 is also a space SL. In FIG. 1, in order to clearly illustrate the neighboring tokens 30, the neighboring tokens 30 are illustrated so as to be separate from each other. However, when the plurality of tokens 30 are stored in the storage part 16, the plurality of tokens 30 are stored such that the neighboring tokens 30 are in contact with each other.

By means of the above-described configuration, when the plurality of tokens 30 are stored in the stacked manner in the storage part 16, the magnetic field generated from each of the magnetic field generating antennas 40 can be exerted on each of the feeder antennas 32 of the plurality of tokens 30 disposed in any positions, and the desired electromotive force can be developed for any of the plurality of tokens 30.

First Embodiment, Second Embodiment, and Third Embodiment

Hereinafter, a first embodiment, a second embodiment, and a third embodiment will be described. In these embodiments, the description will be made by using gaming chips used in a casino as one example of tokens and using a chip tray as one example of a token storage device.

First Embodiment

Chip Tray 100

Figure 2A:
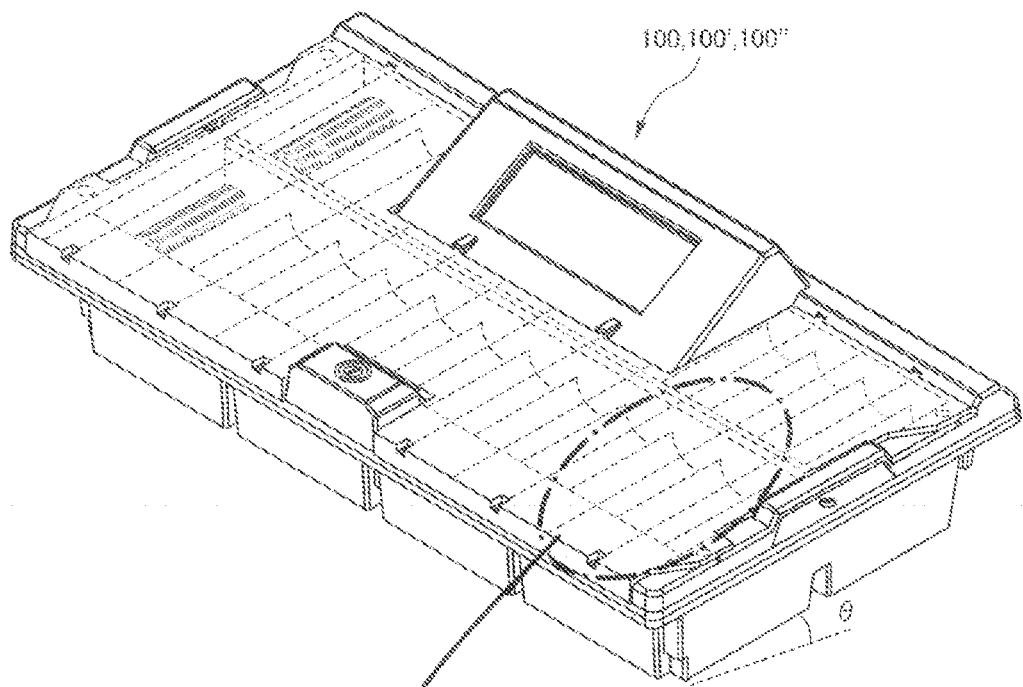
FIG. 2A is a perspective view illustrating a chip tray 100 and FIG. 2B is a perspective view illustrating a surface of one tray unit 104.
Figure 2B:
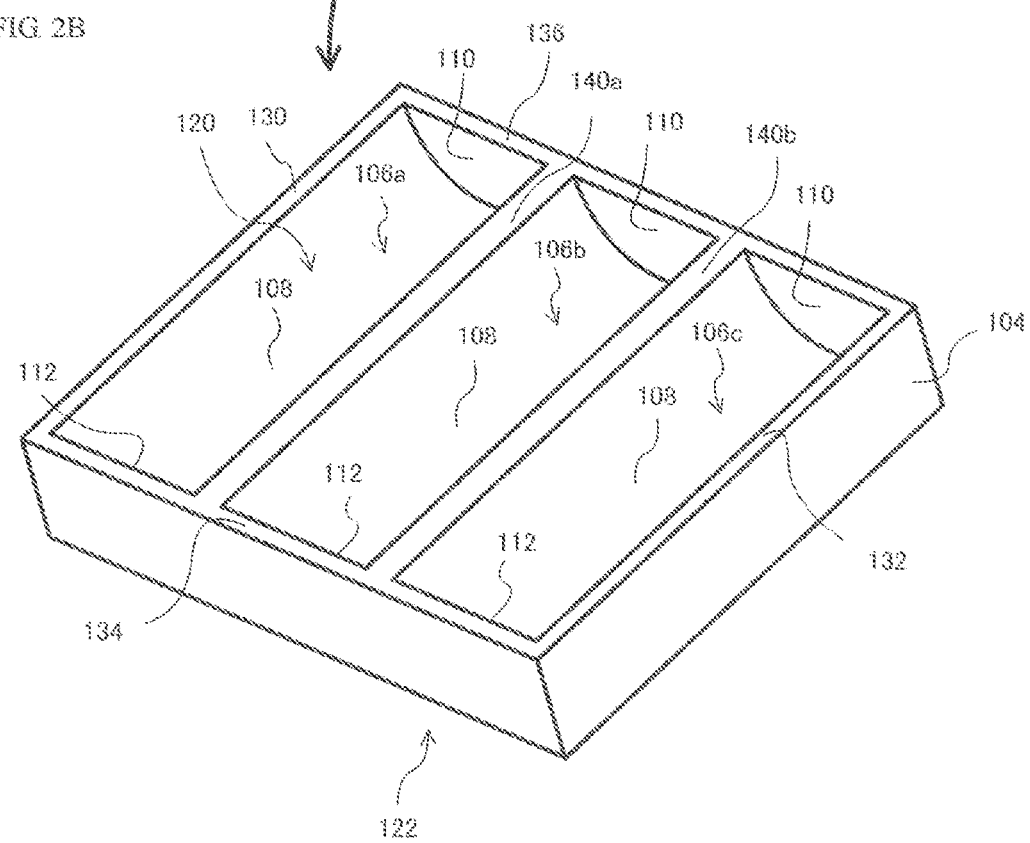

FIG. 2A is a perspective view illustrating a chip tray 100. FIG. 2B is a perspective view illustrating a surface of a tray unit 104.

The chip tray 100 is a tray to store gaming chips 300 to be provided to a player and gaming chips 300 collected from a player. The chip tray 100 has tray units 104 and antennas 200. In the present embodiment, a structure in which the antennas 200 are attached to each of the tray units 104 is referred to as a chip tray structure 102.

In the present embodiment, the chip tray 100 has six tray units 104 (chip tray structures 102). As shown in FIG. 2B, in each of the tray units 104, three chip storing grooves 106a, 106b, and 106c are formed. In each of the chip storing grooves 106a (106b and 106c), a plurality of gaming chips 300, for example, 30 gaming chips 300 can be stored. Each of the tray units 104 is formed of, for example, an opaque plastic material. Each of the tray units 104 has a box-like shape of a rectangular parallelepiped.

<<Chip Tray Structure 102>>

Figure 3:
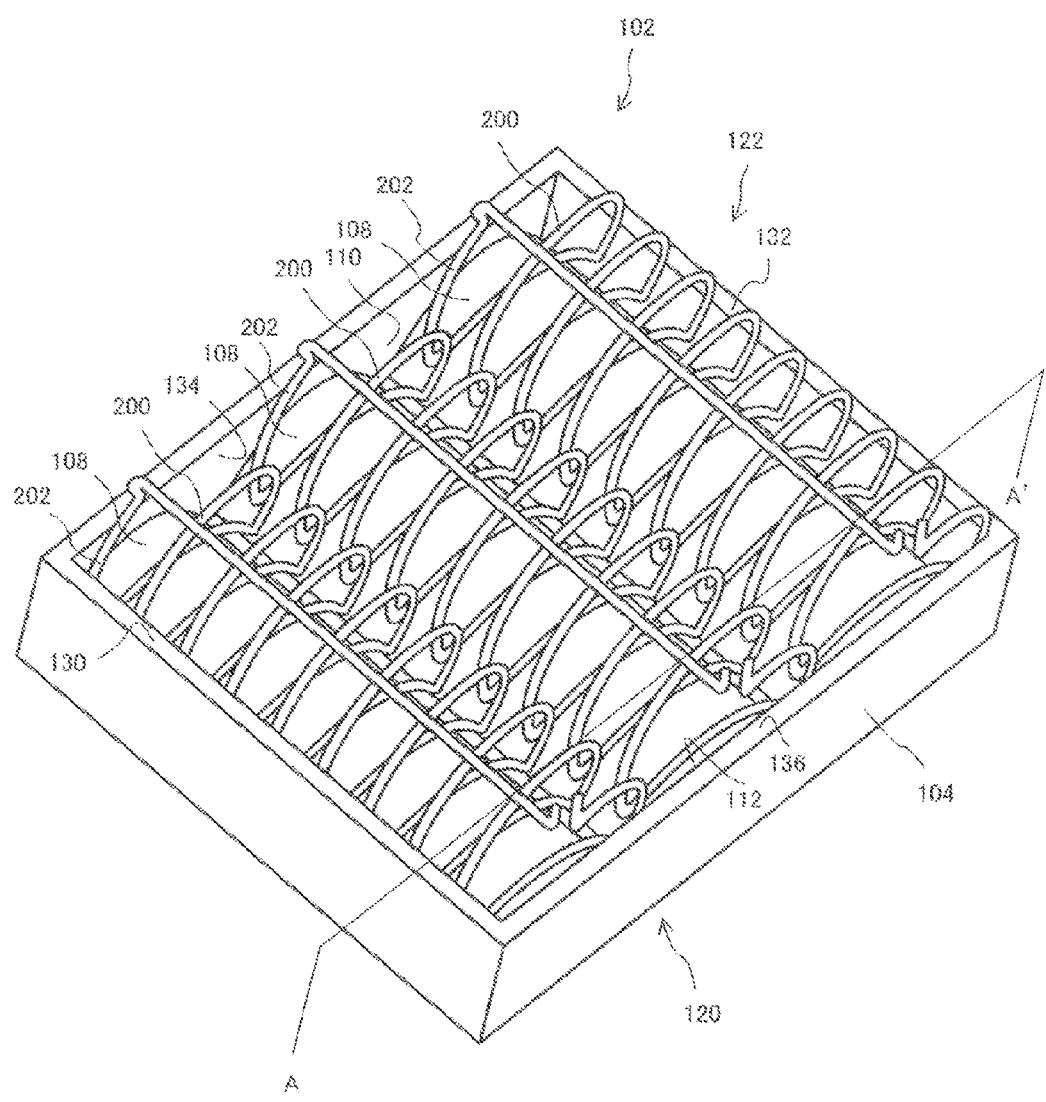
FIG. 3 is a perspective view illustrating a configuration of a back side of one chip tray structure 102.
Figure 4:
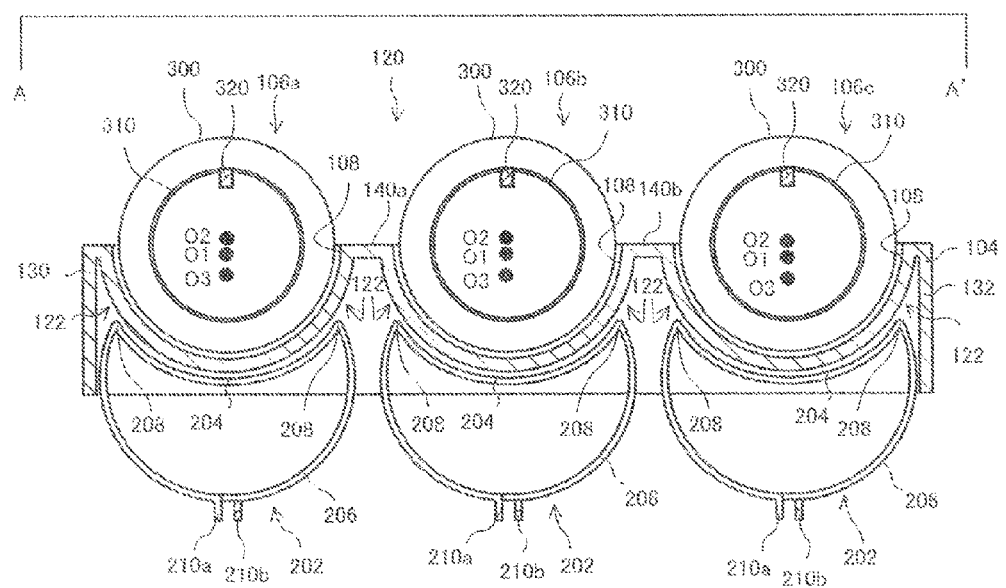
FIG. 4 is a sectional front view of a cross-section, taken from a line A-A' in a first embodiment.

FIG. 3 is a perspective view illustrating a configuration of a back side of one chip tray structure 102. FIG. 4 is a sectional front view, taken from a line A-A' in FIG. 3.

As shown in FIG. 3, each of the chip tray structure 102 has the three chip storing grooves 106a, 106b, and 106c and three antennas 200a, 200b, and 200c. As shown in FIG. 2B, in the chip tray structure 102, the three chip storing grooves 106a, 106b, and 106c are formed in parallel with one another. In the present embodiment, when it is not particularly needed to distinguish the three chip storing grooves 106a, 106b, and 106c, each of the chip storing grooves 106a, 106b, and 106c is merely referred to as a chip storing groove 106. Similarly, when it is not particularly needed to distinguish the three antennas 200a, 200b, and 200c, each of the antennas 200a, 200b, and 200c is referred to as an antenna 200.

As shown in FIG. 2B, FIG. 3, and FIG. 4, the chip tray 100 has a chip juxtaposing face 120 and an antenna disposition face 122. The chip juxtaposing face 120 is a face on which the gaming chips 300 are juxtaposed, that is, a surface of the chip tray 100. The antenna disposition face 122 is a face on which the antennas 200 are disposed. The antenna disposition face 122 is a face of a back side of the chip juxtaposing face 120 and a back surface of the chip tray 100. In the present specification, "to juxtapose" is to arrange a plurality of articles side by side. For example, to arrange the gaming chips is to juxtapose the gaming chips.

<First Wall Part 130, Second Wall Part 132, Third Wall Part 134, and Fourth Wall Part 136>

As shown in FIG. 2B, FIG. 3, and FIG. 4, in the chip tray structure 102, four wall parts which are a first wall part 130, a second wall part 132, a third wall part 134, and a fourth wall part 136 are integrally formed. A contour of the chip tray structure 102 (tray unit 104) is defined by these wall parts 130, 132, 134, and 136.

The first wall part 130 and the second wall part 132 are formed in parallel with each other so as to face each other. The third wall part 134 and the fourth wall part 136 are formed in parallel with each other so as to face each other. Each of the first wall part 130 and the second wall part 132 has a longer shape than that of each of the third wall part 134 and the fourth wall part 136.

<Partition Parts 140a and 140b>

In the chip tray structure 102, partition parts 140a and 140b are integrally formed. As described above, the three chip storing grooves 106a, 106b, and 106c are formed in parallel with one another. The partition part 140a partitions the neighboring chip storing groove 106a and chip storing groove 106b and becomes a boundary. Similarly, the partition part 140b partitions the neighboring chip storing groove 106b and chip storing groove 106c and becomes a boundary.

The partition part 140a has a predetermined width. It is preferable that the predetermined width is, for example, a width which does not allow the gaming chips 300 juxtaposed in the chip storing groove 106a and the gaming chips 300 juxtaposed in the chip storing groove 106b respectively to contact each other. Similarly, the partition part 140b also has a predetermined width. It is preferable that the predetermined width is, for example, a width which does not allow the gaming chips 300 juxtaposed in the chip storing groove 106b and the gaming chips 300 juxtaposed in the chip storing groove 106c respectively to contact each other.

<<Chip Storing Grooves 106>>

Each of the chip storing grooves 106 has the chip juxtaposing part 108, the first storage end portion 110, and the second storage end portion 112.

<Chip Juxtaposing Parts 108>

In each of the chip juxtaposing part 108, up to 30 gaming chips 300 are stored. As shown in FIG. 2B and FIG. 4, each of the chip juxtaposing parts 108 has a semicylindrical long shape. Accordingly, a cross-section of each of the chip juxtaposing parts 108 has a semicircular shape.

The chip juxtaposing face 120 (upper face) of each of the chip juxtaposing parts 108 is an inner side face of the semicylindrical shape (inner side face of the cylindrical shape). In other words, the chip juxtaposing face 120 of each of the chip juxtaposing parts 108 is of a semicylindricallly depressed shape. In this chip juxtaposing face 120 of each of the chip juxtaposing parts 108, the gaming chips 300 are juxtaposed. Accordingly, the chip juxtaposing face 120 of each of the chip juxtaposing parts 108 functions as a bottom face of each of the chip juxtaposing parts 108.

The antenna disposition face 122 (back face) of each of the chip juxtaposing parts 108 is an outer side face of the semicylindrical shape (outer side face of the cylindrical shape). In other words, the antenna disposition face 122 of each of the chip juxtaposing parts 108 is of a semicylindricallly bulging shape. On this antenna disposition face 122 of each of the chip juxtaposing parts 108, each of the antennas 200 is disposed.

The chip juxtaposing parts 108 are formed such that a diameter of the chip juxtaposing face 120 of each of the chip juxtaposing parts 108 is larger than a diameter of each of the gaming chips 300 to be stored. In addition, the chip juxtaposing parts 108 are formed such that a diameter of the antenna disposition face 122 of each of the chip juxtaposing parts 108 is the same as a diameter of the facing part 204 of the unit antenna 202 of each of the antennas 200. The facing part 204 of the unit antenna 202 of each of the antennas 200 will be described later.

Figure 6:
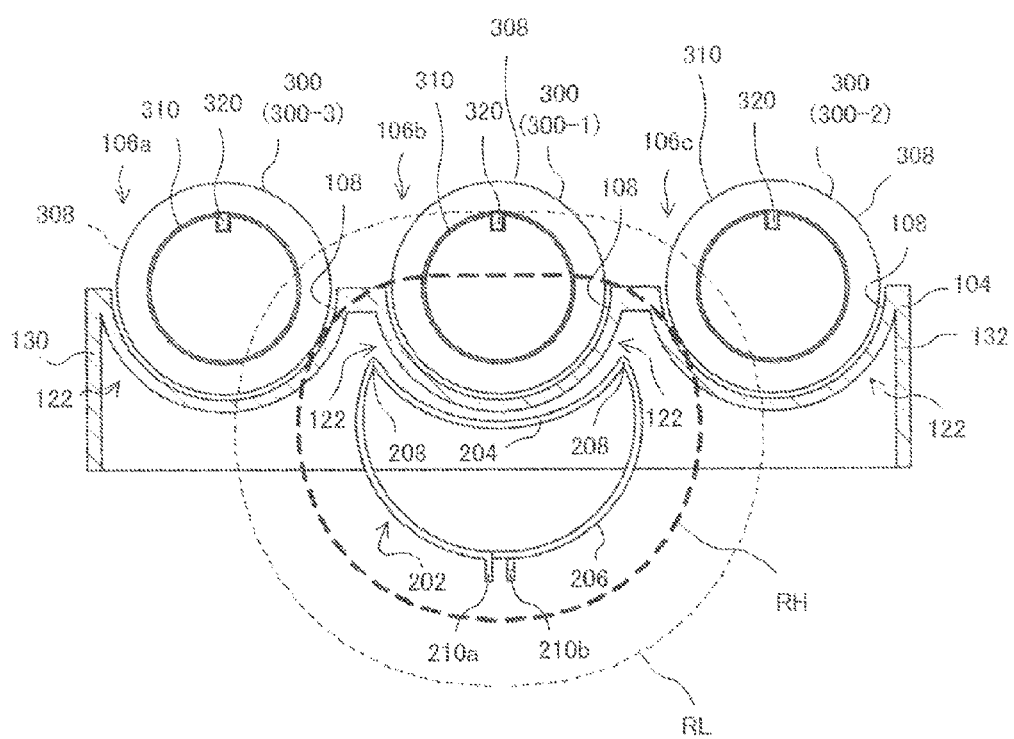
FIG. 6 is a diagram illustrating a view in which magnetic field lines formed by unit antennas 202 stretch therearound, viewed from an axial direction of each chip storing groove 106.
Figure 7A:
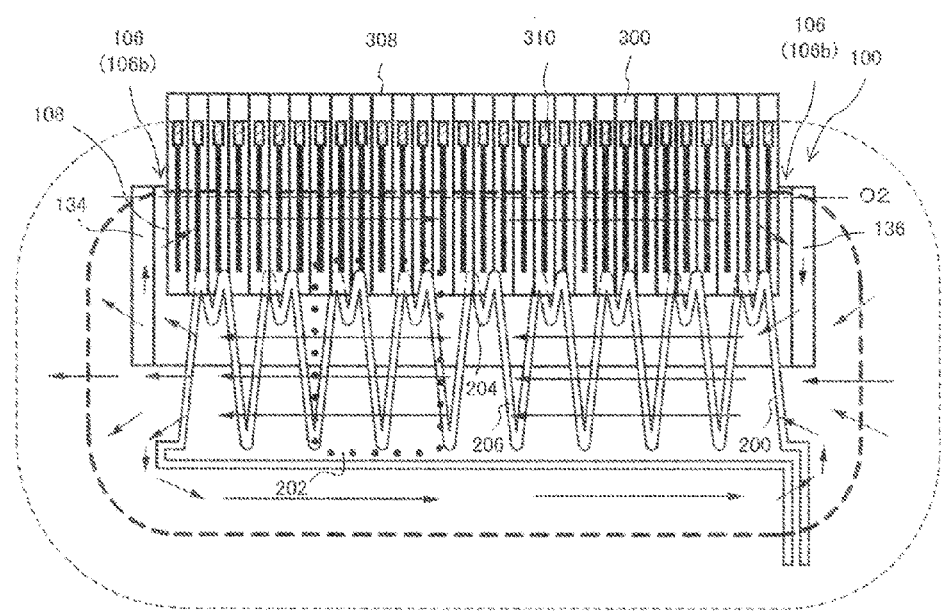
FIGS. 7A and 7B are diagrams illustrating a state in which the magnetic field lines formed by the unit antennas 202 coil and penetrate through IC tags 320 for use in RFID of gaming chips 300 stored in a chip juxtaposing part 108 in a stacked manner.
Figure 7B:
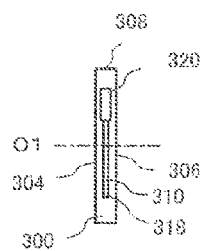

As shown in FIG. 6 and FIG. 7B, each of the gaming chips 300 has a disc-like shape.

As shown in FIG. 7B, each of the gaming chips 300 has two circular surface parts 304 and 306 which face each other and a cylindrical side face part 308. The gaming chips 300 are placed in the chip juxtaposing part 108 such that a central axis O1 of each of the disc-like gaming chips 300 comes to be substantially in parallel with a central axis O2 of the chip juxtaposing part 108. In other words, the gaming chips 300 are placed so as to have a substantially coaxial relationship with the chip juxtaposing part 108. At this time, as shown in FIG. 4, the gaming chips 300 are placed in the chip juxtaposing part 108 such that a portion of the side face part 308 of each of the gaming chips 300 contacts the chip juxtaposing face 120 of each of the chip juxtaposing parts 108. As described above, the gaming chips 300 are supported by the chip juxtaposing face 120 of the chip juxtaposing part 108 and held on the chip juxtaposing face 120 of the chip juxtaposing part 108. In this way, the chip juxtaposing face 120 of the chip juxtaposing part 108 functions as a bottom face of the chip juxtaposing part 108.

As described above, when the gaming chips 300 are placed in the chip juxtaposing part 108 such that the central axis O1 of each of the disc-like gaming chips 300 comes to be substantially parallel with the central axis O2 of the chip juxtaposing part 108, each of the gaming chips 300 has the regular posture.

When each of the chip juxtaposing parts 108 is disposed so as to be inclined at the angle θ with respect to the horizontal direction, that is, when each of the chip juxtaposing parts 108 is formed so as to be of a slope shape, it is made easier for the gaming chips 300 to be displaced toward one direction (downward) by the action of gravity. When the gaming chips 300 are displaced downward, the gaming chips 300 are stopped by either of the first storage end portion 110 or the second storage end portion 112. Accordingly, by stopping the gaming chips 300, the gaming chips 300 are disposed so as to be naturally stacked in the chip juxtaposing part 108, thereby allowing the plurality of tokens 30 to be stored in the stacked manner. As described above, each of the chip juxtaposing parts 108 is formed so as to be inclined at the angle θ with respect to the horizontal direction, thereby causing the gaming chips 300 to have the regular postures and allowing the gaming chips 300 to be easily stored in the stacked manner.

In order to form each of the chip juxtaposing parts 108 so as to be inclined with respect to the horizontal direction, for example, it is only required to previously form the tray unit 104 such that each of the chip juxtaposing parts 108 is inclined with respect to the horizontal direction. In addition, also by installing the chip tray 100 so as to be inclined with respect to the horizontal direction, each of the chip juxtaposing parts 108 can be made inclined with respect to the horizontal direction.

When the plurality of gaming chips 300 are placed in each of the chip juxtaposing parts 108, the plurality of gaming chips 300 are placed such that the surface parts 304 and 306 of the neighboring gaming chips 300 are arranged so as to neighbor each other. As described above, by placing the plurality of gaming chips 300, the plurality of gaming chips 300 are juxtaposed along a longitudinal direction of each of the chip juxtaposing parts 108. In this case, the plurality of gaming chips 300 are placed such that a central axis of each of the plurality of gaming chips 300 comes to be substantially in parallel with the central axis O2 of the semicylindrical chip juxtaposing part 108. In the present embodiment, the longitudinal direction of the chip juxtaposing part 108 corresponds to the juxtaposing direction in which the gaming chips 300 are juxtaposed.

<First Storage End Portion 110 and Second Storage End Portion 112>

The first storage end portion 110 is formed by one portion of the first wall part 130 of the tray unit 104. Similarly, the second storage end portion 112 is formed by one portion of the second wall part 132 of the tray unit 104. Each of the first storage end portion 110 and the second storage end portion 112 has a semicircular shape. The second storage end portion 112 is formed in a position away from the first storage end portion 110 along the longitudinal direction of the chip juxtaposing part 108. The first storage end portion 110 and the second storage end portion 112 face each other with the chip juxtaposing part 108 sandwiched therebetween. The first storage end portion 110 and the second storage end portion 112 support the gaming chips 300 placed at end portions of the chip juxtaposing part 108.

The first storage end portion 110 constitutes one of the two end portions disposed in the longitudinal direction of the chip juxtaposing part 108. Similarly, the second storage end portion 112 constitutes the other of the two end portions disposed in the longitudinal direction of the chip juxtaposing part 108.

<<Antenna 200>>

Figure 5:
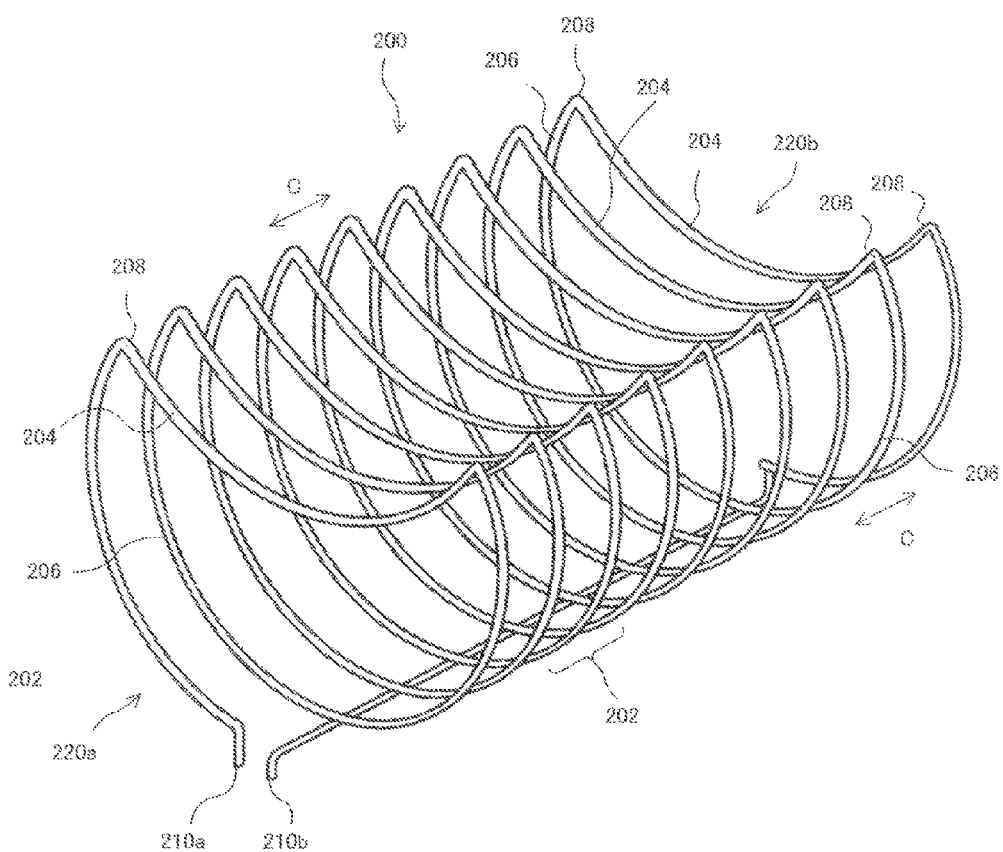
FIG. 5 is a perspective view illustrating an outline of an antenna 200.

FIG. 5 is a perspective view illustrating an outline of the antennas 200. As shown in FIG. 5, the antenna 200 in the first embodiment is a coil formed in a three-dimensional manner and has a shape formed by bending and coiling a single lead wire at a plurality of times in a spiral manner and a coaxial manner. The antenna 200 has a shape along a coaxial direction. The antenna 200 has a long shape as a whole, which is similar to a shape of the so-called solenoid and helical antenna. As described above, the antenna 200 is formed so as to have the long shape as a whole, thereby allowing the antenna 200 to be disposed on the antenna disposition face 122 of the chip juxtaposing part 108. More specifically, the antenna 200 can be disposed on the antenna disposition face 122 along the juxtaposing direction (stacking direction) of the chip juxtaposing part 108.

It is preferable that the antenna 200 is formed of a material, for example, metal such as copper and aluminum, which has a low resistance value. As the material of the antenna 200, it is only required to be capable of allowing an electric current to efficiently pass therethrough and generating the magnetic field.

FIG. 5 shows only a main body of the antenna 200. In FIG. 5, a configuration for holding the antenna 200 in the chip tray structure 102 and a variety of circuits for processing signals, such as a signal for impedance matching or the like, are omitted.

As shown in FIG. 3 and FIG. 4, in the first embodiment, the antenna 200 is disposed in the antenna disposition face 122 of the chip juxtaposing part 108. Further, the antenna 200 is disposed such that a longitudinal direction of the antenna 200 is in parallel with the longitudinal direction of the chip juxtaposing part 108 (the juxtaposing direction or the stacking direction). The antenna 200 is disposed between the first storage end portion 110 and the second storage end portion 112. Accordingly, in the first embodiment, the antenna 200 is not extended to side portions of the first storage end portion 110 and the second storage end portion 112. In order to adjust a magnitude and a direction (shapes of magnetic field lines) of the magnetic field in the vicinity of the first storage end portion 110 and the second storage end portion 112, a configuration in which the antenna 200 is extended to the side portions of the first storage end portion 110 and the second storage end portion 112 may be employed.

Even in the case where the antenna 200 is extended to the side portions of the first storage end portion 110 and the second storage end portion 112, the antenna 200 is not present in directions along the first storage end portion 110 and the second storage end portion 112 (back sides of the first storage end portion 110 and the second storage end portion 112).

Specifically, an antenna 200a is disposed in the antenna disposition face 122 of each of the chip juxtaposing parts 108 along a longitudinal direction of a chip storing groove 106a. An antenna 200b is disposed in the antenna disposition face 122 of each of the chip juxtaposing parts 108 along a longitudinal direction of a chip storing groove 106b. An antenna 200c is disposed in the antenna disposition face 122 of each of the chip juxtaposing parts 108 along a longitudinal direction of a chip storing groove 106c.

The antenna 200 in the first embodiment is disposed so as to be extended across the side portion of the chip juxtaposing part 108 along the longitudinal direction of the chip juxtaposing part 108. Therefore, the configuration of the first embodiment is different from a configuration of the conventional chip tray in which an antenna is disposed along faces of the first storage end portion 110 and the second storage end portion 112.

As described above, in the chip tray 100, the three chip storing grooves 106a, 106b, and 106c are formed so as to be in parallel with one another. Accordingly, the antennas 200a, 200b, and 200c disposed in the chip storing grooves 106a, 106b, and 106c are also disposed so as to be in parallel with one another.

As shown in FIG. 4 and FIG. 5, the antenna 200 has two connecting end portions 210a and 210b. Electrically connected to the two connecting end portions 210a and 210b are RF readers (refer to FIG. 11) via an impedance matching circuit (not shown). When RF signals are outputted from the RF readers, magnetic fields having predetermined magnitudes are generated inside and outside of the antenna 200. Through wireless communications using the antenna 200, the RF readers read out a variety of information such as identification information stored in a storage part 316 (refer to FIG. 12) of an IC tag 320 for use in RFID of each of the gaming chips 300.

<<Unit Antennas 202>>

As shown in FIG. 5, the antenna 200 has a plurality of unit antennas 202 connected thereto and has a helical shape. As described above, a magnetic field generated by the configuration (refer to FIG. 5 and FIG. 8) in which the plurality of unit antennas 202 are connected and has the helical shape penetrate through the IC tags 320 for use in RFID of the gaming chips 300 in corresponding positions (refer to FIG. 7). An electric current induced by the inversion of the magnetic field penetrating through the IC tags 320 for use in RFID flows to the antennas 310, generates electromotive force, and drives the IC tags 320 for use in RFID. The driven IC tags 320 for use in RFID transmit signals indicating the identification information to the RF readers by load modulation, and the RF readers receive these signals, thereby allowing the identification information stored in the storage parts 316 of the IC tags 320 for use in RFID to be read out.

<Facing Parts 204>

As shown in FIG. 5, each of the facing parts 204 of the unit antennas 202 has an arc shape. In other words, each of the facing parts 204 has the arc shape with a predetermined radius. Each of the facing parts 204 is formed between two neighboring bending parts 208. The facing parts 204 are disposed on the antenna disposition face 122 of each of the chip juxtaposing parts 108. The facing parts 204 are disposed so as to be positioned toward the chip juxtaposing part 108 (so as to face the chip juxtaposing part 108). More specifically, the facing parts 204 are disposed so as to be positioned toward the chip juxtaposing part 108 (so as to face the chip juxtaposing part 108) in a direction perpendicular to the juxtaposing direction in which the gaming chips 300 are juxtaposed. As described above, the facing parts 204 and the chip juxtaposing parts 108 are formed such that a curvature radius of each of the facing parts 204 and a curvature radius of the antenna disposition face 122 of each of the chip juxtaposing parts 108 are the same as each other.

These facing parts 204 correspond to one part of the coiling part of the magnetic field generating antenna for generating the magnetic field. As described above, the facing parts 204 are disposed in the direction perpendicular to the juxtaposing direction in which the gaming chips 300 are juxtaposed. As described below, the antennas 310 are disposed in parallel with the gaming chips 300. Accordingly, the facing parts 204 are disposed in parallel with the antennas 310 embedded in the gaming chips 300. Each of the facing parts 204 is formed so as to be short with respect to the later-described connecting part 206 and each of the facing parts 204 is disposed substantially in parallel with the antenna 310.

<Connecting Parts 206>

Each of the connecting parts 206 has an arc shape. In other words, each of the connecting parts 206 has the arc shape with a predetermined radius. A length of the arc of each of the connecting parts 206 is longer than a length of each of the facing parts 204. As shown in FIG. 5, the connecting parts 206 electrically connect two neighboring facing parts 204. Each of the facing parts 204 and each of the connecting parts 206 are electrically connected to each other at the bending parts 208. In other words, each of the facing parts 204 and each of the connecting parts 206 are electrically connected via the bending parts 208.

Each of the connecting parts 206 is disposed in a position more away from the chip juxtaposing part 108 than each of the facing parts 204 is away therefrom. More specifically, each of the connecting parts 206 is disposed in the position more away from the chip juxtaposing part 108 than each of the facing parts 204 is away therefrom so as to be positioned toward the chip juxtaposing part 108 (so as to face the chip juxtaposing part 108) in a direction perpendicular to the juxtaposing direction in which the gaming chips 300 are juxtaposed.

In the first embodiment, the case where the antenna 200 is formed by bending and coiling one lead wire is described. However, a plurality of facing parts 204 and connecting parts 206 may be formed and electrically connected to each other, respectively. In any case, it is only required to integrally form each of the antennas 200 as a whole. In addition, as shown in FIG. 5, two neighboring facing parts 204 and two neighboring connecting parts 206 are apart from each other at a distance C, respectively.

<Antennas 200 and Chip Storing Grooves 106>

As shown in FIG. 5, in the antenna 200, the plurality of facing parts 204 are arranged. As described above, each of the facing parts 204 and each of the chip juxtaposing parts 108 are formed such that the curvature radius of each of the facing parts 204 and the curvature radius of the antenna disposition face 122 of each of the chip juxtaposing parts 108 are the same as each other. Accordingly, a curved surface including the plurality of facing parts 204 and a curved surface of the antenna disposition face 122 of each of the chip juxtaposing parts 108 coincide with each other. Therefore, each of the antennas 200 can be installed in each of the chip storing grooves 106 such that the facing parts 204 are in close contact with the antenna disposition face 122 of each of the chip juxtaposing parts 108.

When the facing parts 204 are installed on the antenna disposition face 122 of each of the chip juxtaposing parts 108, the facing parts 204 are disposed on the antenna disposition face 122 of each of the chip juxtaposing parts 108 such that a central axis O3 (refer to FIG. 4) of each of the arc-shaped facing parts 204 is substantially in parallel with a central axis O2 of each of the chip juxtaposing parts 108 (refer to FIG. 4). It is only required that by using a boding member such as an adhesive and screws, the antenna 200 is installed in each of the chip storing grooves 106.

In the first embodiment, the case where the shapes of each of the facing parts 204 and the antenna disposition face 122 of the chip juxtaposing part 108 are made arc-like is described. However, it is not needed to make these shapes arc-like, and it is only required that the magnetic field generated by the plurality of facing parts 204 generates the electric current to drive the IC tags 320 for use in RFID embedded in the plurality of gaming chips 300 placed via the chip juxtaposing part 108, thereby allowing the identification information to be read out.

<<<Gaming Chips 300>>

The gaming chips 300 are gaming media (storage media) used by dealers and players as a substitute for cash in a gaming house such as a casino. In general, the gaming chips 300 are media obtained by forming a resin or the like so as to be disc-like.

Figure 11:
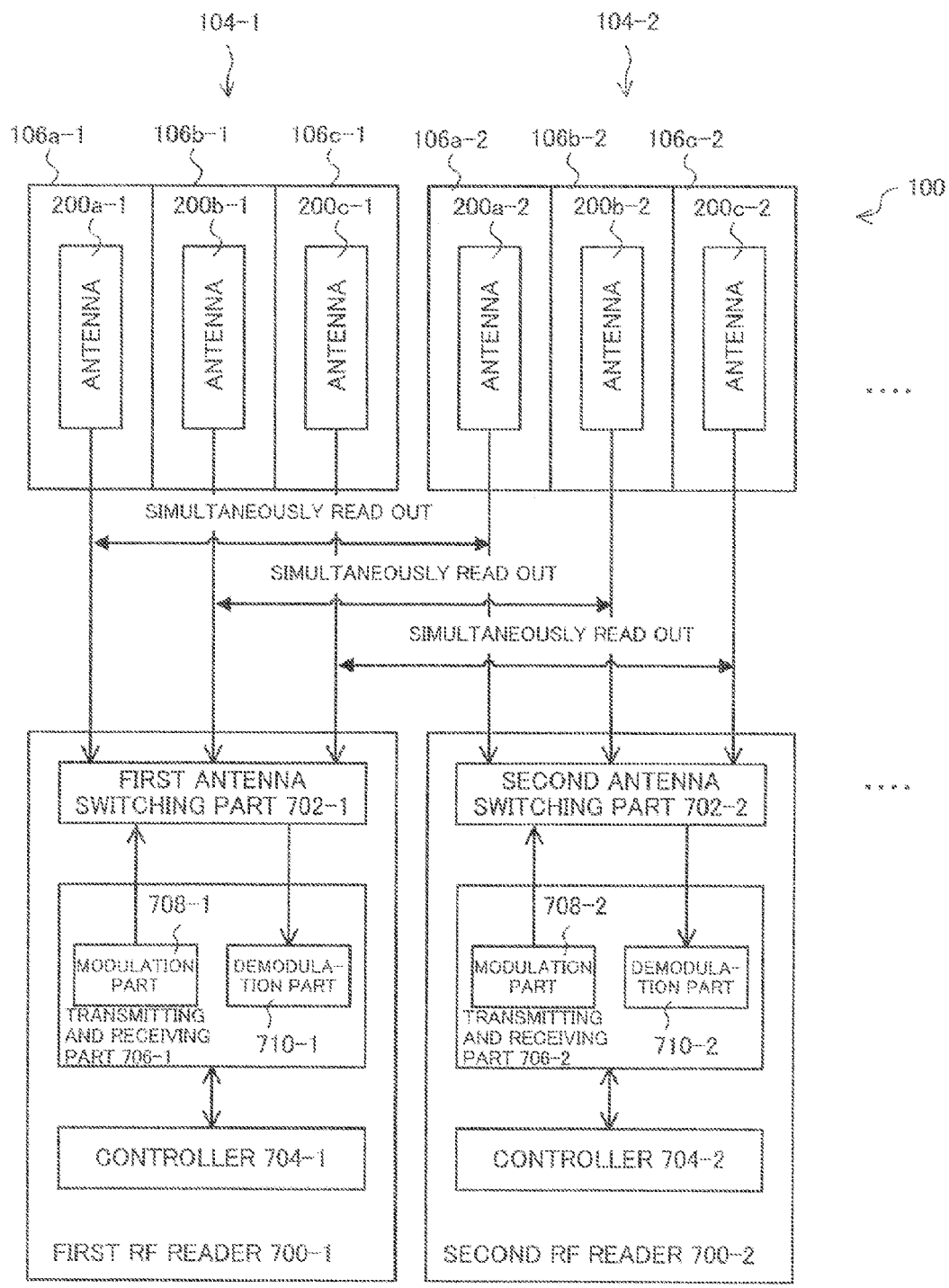
FIG. 11 is a diagram illustrating an outline of a chip tray system having a chip tray 100, a first RF reader 700-1, and a second RF reader 700-2.
Figure 12:
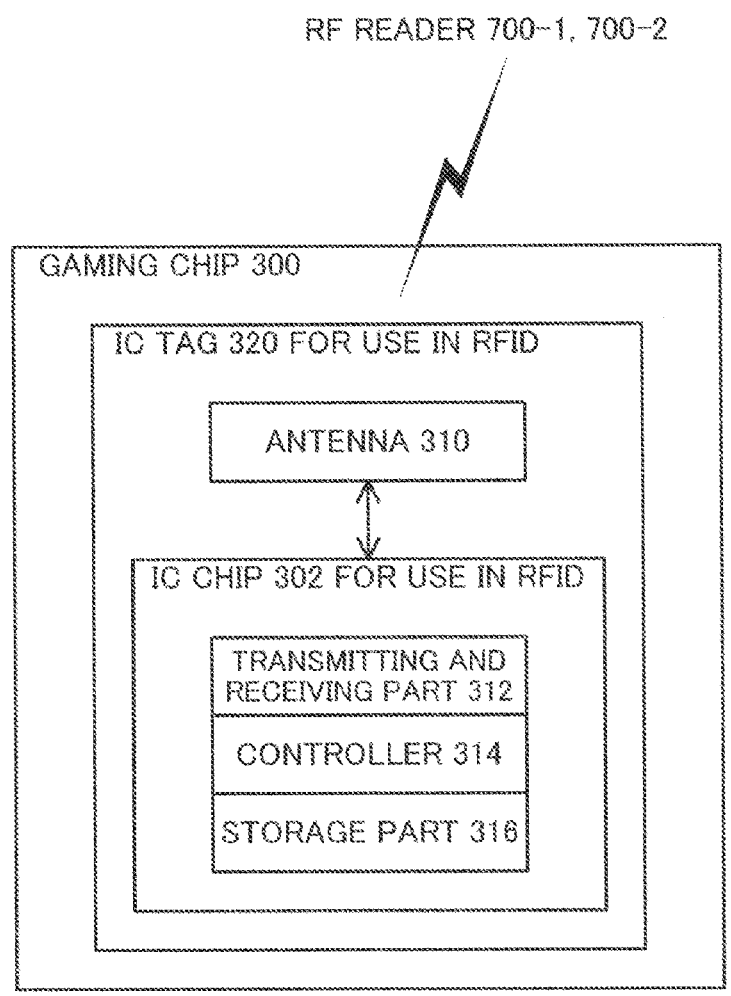
FIG. 12 is a block diagram showing a configuration of a gaming chip 300.

As shown in FIG. 12, each of the gaming chips 300 has an IC chip 302 for use in RFID and an antenna 310. The storage part 316 of the IC chip 302 for use in RFID has stored therein a variety of pieces of information such as the identification information. A controller 314 interprets commands, requests, instructions, and the like issued from the RF readers (refer to FIG. 11.) and executes operations in response thereto. A transmitting and receiving part 312 has a modulation part (not shown) and a demodulation part (not shown). The transmitting and receiving part 312 performs modulation and demodulation of signals to wirelessly transmit and receive the variety of pieces of information such as the identification information to and from the RF readers.

Each of the gaming chips 300 has the disc-like shape. Each of the gaming chips 300 has the circular two surface parts 304 and 306 facing each other and the cylindrical side face part 308. The IC tag 320 for use in RFID is installed inside of each of the gaming chips 300. When the magnetic field lines penetrate through the two surface parts 304 and 306, the IC tag 320 for use in RFID can accurately read out chip identification information. Each of the gaming chips 300 is formed by coating an IC tag 320 for use in RFID with a resin and forming the resultant to be disc-like.

The antenna 310 of each of the gaming chips 300 is the so-called loop antenna obtained by forming a lead wire to be ring-like (loop-shaped). A shown in FIG. 7B, the antenna 310 of each of the gaming chips 300 has the coiling part 318 which coils the flowing electric current. The antenna 310 has a flat plate shape. The antenna 310 is installed so as to be sandwiched by the two surface parts 304 and 306. The antenna 310 is embedded in each of the gaming chips 300 so as to be in parallel with the two surface parts 304 and 306.

The induced electric current is generated by the magnetic field generated by the antenna 200, and the antenna 30 develops the electromotive force from the antenna 30 by the induced electric current. When the magnetic field with a lot of perpendicular components penetrating through the coiling part 318 of the antenna 310 is exerted on the antenna 310, the magnitude of the electromotive force is increased. Accordingly, it is preferable that the antenna 200 and the gaming chips 300 are disposed such that the magnetic field lines of the magnetic field generated by the antenna 200 perpendicularly penetrate through the antenna 310. In the present embodiment, the antenna 310 is installed so as to be in parallel with each of the gaming chips 300. Accordingly, when it is arranged that the magnetic field lines of the magnetic field generated by the antenna 200 penetrate through the gaming chips 300, these magnetic field lines come to perpendicularly penetrate through the antenna 310.

When the antenna 310 is not installed so as to be in parallel with each of the gaming chips 300, it is preferable that the antenna 200 and the gaming chips 300 are disposed such that the magnetic field lines of the magnetic field generated by the antenna 200 perpendicularly penetrate through the antenna 310.

<<<<Magnetic Field (Magnetic Field Lines)>>>>

Figure 9:
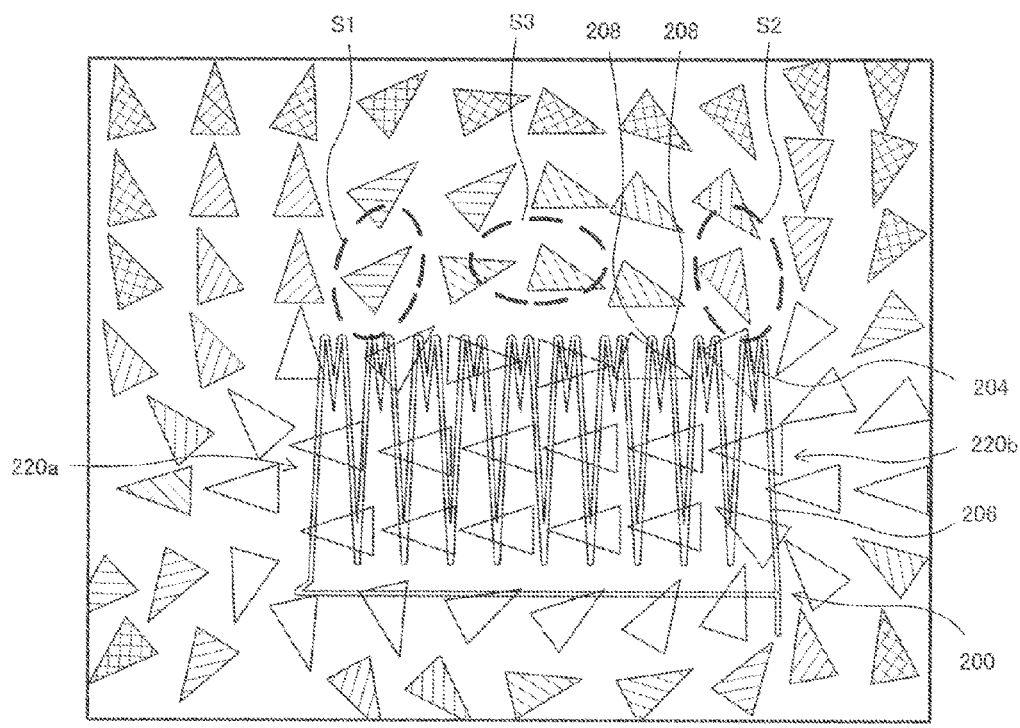
FIG. 9 is a diagram illustrating a result of a simulation for showing a direction and an intensity of the magnetic field generated by the antenna 200.
Figure 10:
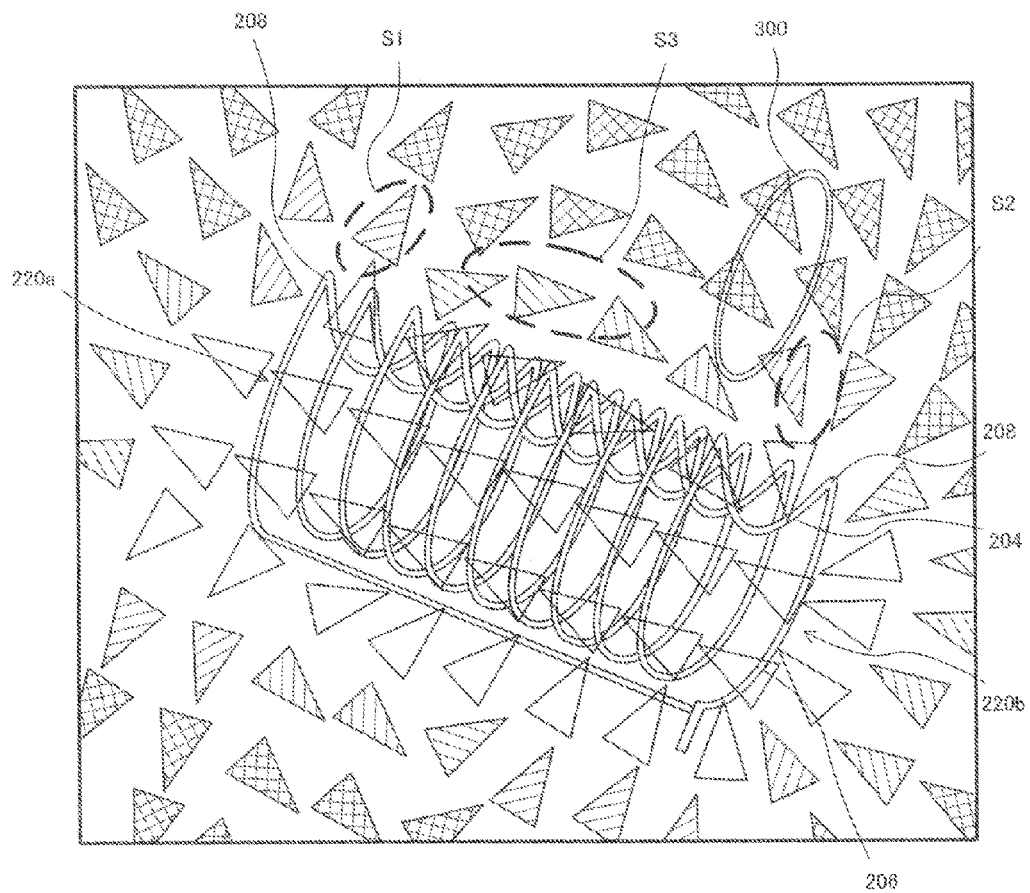
FIG. 10 is a diagram illustrating a result of a simulation for showing a direction and an intensity of the magnetic field generated by the antenna 200.

FIG. 6 is a diagram illustrating a view in which the magnetic field lines formed by the unit antennas 202 stretch therearound, viewed from an axial direction of each of the chip storing grooves 106. FIG. 7A is a diagram illustrating a state in which the magnetic field lines formed by the unit antennas 202 coil and penetrate through the IC tags 320 for use in RFID of the gaming chips 300 stored in the chip juxtaposing part 108 in the stacked manner. Each of FIG. 9 and FIG. 10 is a diagram illustrating a result of a simulation for showing a direction and an intensity of the magnetic field (magnetic field lines) generated by the antenna 200.

<<<Magnetic Field Lines Generated by Unit Antennas 202>>>

Figure 8:
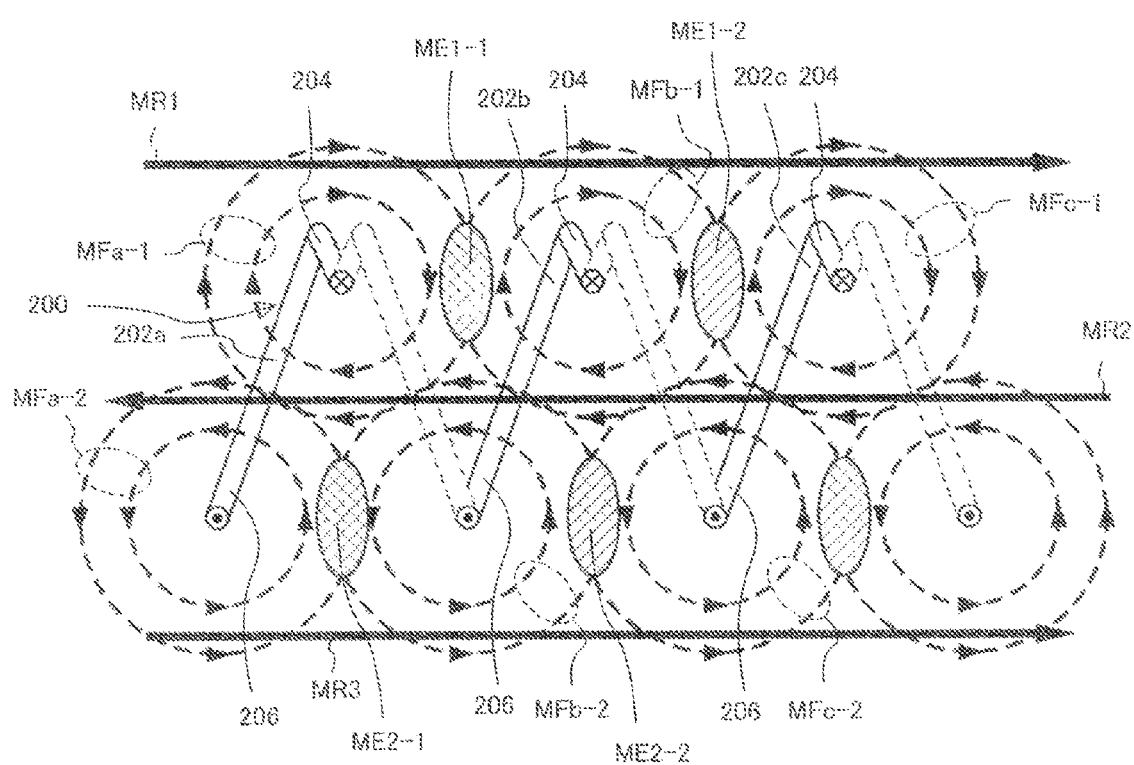
FIG. 8 is a diagram illustrating a view of magnetic fields generated by three unit antennas 202a, 202b, and 202c.

FIG. 8 is a diagram illustrating a view of the magnetic field generated by each of three unit antennas 202a, 202b, and 202c as one example. FIG. 8 is a cross-sectional view illustrating only the three unit antennas 202a, 202b, and 202c of the antenna 200, viewed by cutting the antenna 200 so as to pass through a central axis of the antenna 200 along a longitudinal direction of the antenna 200. As shown in FIG. 8, a portion illustrated by a broken line of each of the three unit antennas 202a, 202b, and 202c shows that the portion of each of the three unit antennas 202a, 202b, and 202c is present on a front side of a cross-section thereof. The broken lines are used to clearly illustrate the whole of each of the three unit antennas 202a, 202b, and 202c.

In the central part of FIG. 8, the three unit antennas 202a, 202b, and 202c formed to be substantially helical are shown. In the example shown in FIG. 8, in each of the three unit antennas 202a, 202b, and 202c, an electric current flows in a direction from the front side toward the back side of the paper surface of FIG. 8 in the facing part 204 and an electric current flows in a direction from the back side toward the front side of the paper surface of FIG. 8 in the connecting part 206. In this case, a magnetic field which coils clockwise is generated in a concentric manner in the facing part 204 and a magnetic field which coils counterclockwise is generated in a concentric manner in the connecting part 206.

In places (ME1-1, ME1-2, ME2-1, and ME2-2) indicated by being hatched in FIG. 8, magnetic fields which coil in respectively reverse directions are generated. Therefore, the magnetic fields mutually cancel out, the magnetic fields having components perpendicular to a longitudinal direction of the antenna 200 disappear or portions having extremely low intensities of the magnetic fields are generated. This mutual cancellation of the magnetic fields occurs not on specific portions but on the entire periphery of the antenna 200 along the longitudinal direction thereof, which is formed in the substantially helical manner. For example, the mutual cancellation of the magnetic fields occurs in each space between neighboring facing parts 204 and each space between two neighboring connecting part 206. In contrast to this, in the vicinity of a central axis of and outside of the antenna 200 formed in the substantially helical manner, the mutual cancellation of the magnetic fields does not occur, and magnetic fields in directions in parallel with the longitudinal direction of the antenna 200 remain.

As described above, a magnetic field MFa-1 is generated by the facing part 204 of the unit antenna 202a, a magnetic field MFb-1 is generated by the facing part 204 of the unit antenna 202b, and a magnetic field MFc-1 is generated by the facing part 204 of the unit antenna 202c. These magnetic field MFa-1, magnetic field MFb-1, and magnetic field MFc-1 are magnetic fields which coil clockwise on the paper surface of FIG. 8.

As shown in FIG. 8, an area ME1-1 whose magnetic field is caused to disappear by the magnetic field MFa-1 and the magnetic field MFb-1 or whose magnetic field intensity is weakened by the magnetic field MFa-1 and the magnetic field MFb-1 is generated. Similarly, an area ME2-1 whose magnetic field is caused to disappear by the magnetic field MFb-1 and the magnetic field MFc-1 or whose magnetic field intensity is weakened by the magnetic field MFb-1 and the magnetic field MFc-1 is generated.

A magnetic field MFa-2 is generated by an end portion of the connecting part 206 of the unit antenna 202a, a magnetic field MFb-2 is generated by an end portion of the connecting part 206 of the unit antenna 202b, and a magnetic field MFc-2 is generated by an end portion of the connecting part 206 of the unit antenna 202c. These magnetic field MFa-2, magnetic field MFb-2, and magnetic field MFc-2 are magnetic fields which coil counterclockwise on the paper surface of FIG. 8.

As shown in FIG. 8, an area ME1-2 whose magnetic field is caused to disappear by the magnetic field MFa-2 and the magnetic field MFb-2 or whose magnetic field intensity is weakened by the magnetic field MFa-2 and the magnetic field MFb-2 is generated. Similarly, an area ME2-2 whose magnetic field is caused to disappear by the magnetic field MFb-2 and the magnetic field MFc-2 or whose magnetic field intensity is weakened by the magnetic field MFb-2 and the magnetic field MFc-2 is generated.

In addition, the consecutive unit antennas 202 (202a, 202b, and 202c) operate as a whole, whereby magnetic fields MR1, MR2, and MR3 as shown in FIG. 8 are generated inside and outside of helical loops. The magnetic field MR1 is a magnetic field which proceeds toward the right on the paper surface of FIG. 8. The magnetic field MR2 is a magnetic field which proceeds toward the left on the paper surface of FIG. 8. The magnetic field MR3 is a magnetic field which proceeds toward the right on the paper surface of FIG. 8.

In addition, the magnetic fields generated by these three consecutive unit antennas 202 (202a, 202b, and 202c) are illustrated in FIG. 6, viewed from an axial direction of each of the chip storing grooves 106. As shown in FIG. 6, a portion inside of a thick broken line RH is an area having a strong magnetic field intensity and a portion between a thin broken line RL and the thick broken line RH is an area having a weak magnetic field intensity. In FIG. 6, the magnetic field areas (ME1-1, ME1-2, ME2-1, and ME2-2), generated between respective turns of the coiling shape of the unit antennas 202 (202a, 202b, and 202c), whose magnetic fields are caused to disappear or whose magnetic field intensities are weakened are not shown.

As shown in FIG. 6, the strong magnetic field generated by the antenna 200 exerts the action on a gaming chip 300 (300-1) which is immediately proximate to the antenna 200 but does not exert the action on the other gaming chips 300 (300-2 and 300-3) which are adjacent thereto. In addition, the weak magnetic field area in the outside thereof generated by the antenna 200 covers the gaming chip 300 (300-1) being proximate thereto and a part of the weak magnetic field area also expands over the other gaming chips 300 (300-2 and 300-3) being adjacent thereto. However, this action is extremely limited, not causing identification information of the adjacent gaming chips 300 to be read out.

In addition, FIG. 7 is a diagram illustrating a magnetic field generated by the antenna 200, viewed from a side direction. As shown in FIG. 7, a strong magnetic field area is generated in the vicinity of a helical loop of the antenna 200, and a weak magnetic field area is generated outside of the helical loop of the antenna 200. Each of FIG. 9 and FIG. 10 is a diagram illustrating a result of a simulation for showing a direction and an intensity of the magnetic field (magnetic field lines) generated by the antenna 200.

As shown in FIG. 6 and FIG. 7, each of the unit antennas 202 is located on the side of the side face part 308 of each of the gaming chips 300. The facing part 204 of each of the unit antennas 202 is located so as to face the side face part 308 of each of the gaming chips 300 along each other. The connecting part 206 of each of the unit antennas 202 is located in the position more away from the chip juxtaposing part 108 than each of the facing parts 204 is away therefrom so as to face the side face part 308 of each of the gaming chips 300.

When the electromotive force is developed in each of the IC tags 320 for use in RFID by the magnetic field generated by the antenna 200, each of the IC tags 320 for use in RFID is driven, thereby allowing the variety of pieces of information such as the identification information stored in the storage parts 316 of the IC tags 320 for use in RFID to be read out from the IC tags 320 for use in RFID.

<Comparison with the Conventional Chip Tray>

FIG. 18 is a schematic view illustrating an outline of the conventional chip tray 1000. The chip tray 1000 shown in FIG. 18 has nine chip storing grooves 106a, 106b, 106c, 106d, 106e, 106f, 106g, 106h, and 106i. A plurality of gaming chips 300 are stored in each of the chip storing grooves 106a, 106b, 106c, 106d, 106e, 106f, 106g, 106h, and 106i. The configuration and function of each of the chip storing grooves 106a, 106b, 106c, 106d, 106e, 106f, 106g, 106h, and 106i and of each of the gaming chips 300 in the chip tray 1000 shown in FIG. 18 are the same as those in the present embodiment. Accordingly, as with the present embodiment, the antenna 310 is embedded in each of the gaming chips 300 and the identification information can be read out from IC tags 320 for use in RFID.

In FIG. 18, only an antenna 1200 which corresponds to the three chip storing grooves 106d, 106e, and 106f is shown. In other words, the targets of the antenna 1200 shown in FIG. 18 are the IC tags 320 for use in RFID of the gaming chips 300 stored in the three chip storing grooves 106d, 106e, and 106f. Accordingly, the gaming chips 300 stored in the three chip storing grooves 106a, 106b, and 106c located on the left side in FIG. 18 and in the three chip storing grooves 106g-106i located on the right side in FIG. 18 are not targeted for the reading-out by the antenna 1200 shown in FIG. 18.

The antenna 1200 is disposed at end portions of the three chip storing grooves 106d, 106e, and 106f. More specifically, as shown in FIG. 18, in the conventional chip tray 1000, the antenna 1200 connected to a reader device (not shown) is disposed in parallel with an antenna 310 (refer to FIG. 6) embedded in each of the gaming chips 300 and on extended lines of central axes O1 of the gaming chips 300 piled up in a stacked manner.

The arrangement of the conventional chip tray 1000 shown in FIG. 18 is an arrangement in general which is made for reading out the IC tags for use in RFID and is considerably suited to read out the IC tags 320 for use in RFID of the gaming chips 300 in the vicinity of the antenna 1200. However, since the magnetic field generated by the antenna 1200 spreads across a wide area in a three-dimensional space and a magnetic flux density is reduced in accordance with a decrease in proximity to the antenna 1200, a magnetic field intensity is decreased in a position away from the antenna 1200, thereby making it impossible to read out the IC tags 320 for use in RFID. As shown in FIG. 18, when a range of a strong magnetic field is expanded beyond a range RA1 (range encircled by a thick broken line shown in FIG. 18) in which normal reading-out is possible in order to also read out IC tags for use in RFID in a position away therefrom, even IC tags for use in RFID included in an expanded range RA2 (range encircled by a thin broken line shown in FIG. 18) which are not required to be read out can also be read out in large quantity, thereby leading to major causes of complexity in data processing and of a reduction in a reading speed.

As described above, in the conventional chip tray 1000, the antenna 1200 is disposed in parallel with the antenna 310 embedded in each of the gaming chips 300 and on the extended lines of the central axes O1 (refer to FIG. 18) of the gaming chips 300 piled up in the stacked manner. On the other hand, the configuration of the chip tray 100 in the present embodiment is different from that of the conventional chip tray 1000 in that the antenna 200 and the IC tags 320 for use in RFID arranged by stacking the gaming chips 300 are arranged substantially in parallel with each other and the antenna 200 is arranged below the IC tags 320 for use in RFID via the chip juxtaposing part 108.

In the vicinity of the unit antennas 202, the magnitude of the magnetic field is large, and in accordance with a decrease in proximity to the unit antennas 202, the magnitude of the magnetic field is decreased. Accordingly, for example, if a magnitude of the magnetic field indicated by RA1 is made to be a magnitude which develops electromotive force allowing IC tags 320 for use in RFID of predetermined gaming chips 300 (gaming chips 300 stored in the chip storing groove 106b) to be driven, as seen in FIG. 6, the strong magnetic field area does not reach the gaming chips 300 stored in positions other than predetermined positions (gaming chips 300 stored in the chip storing grooves 106a and 106c), thereby not allowing IC tags 320 for use in RFID other than the predetermined gaming chips 300 to be read out.

As described above, it is only required to determine electric power supplied to the antenna 200 such that the identification information of the IC tags 320 for use in RFID of the gaming chips 300 disposed in a predetermined position is read out and the identification information of the IC tags 320 for use in RFID of the gaming chips 300 disposed in a position other than the predetermined position is not read out. Thus, only the IC tags 320 for use in RFID in a position in which the reading-out is desired can be read out, thereby making it possible to prevent the IC tags 320 for use in RFID, in a position in which the reading-out is not desired, from being read out and to enhance a reading speed.

In addition, as described above, the antenna 200 is constituted of the plurality of unit antennas 202. Also by a space C (refer to FIG. 5) between neighboring unit antennas 202, a magnitude of the magnetic field generated by the antenna 200 can be adjusted. Accordingly, by appropriately determining the magnitude of the electric power supplied to the antenna 200 and the space C between the neighboring unit antennas 202, the arrangement in which the identification information of the IC tags for use in RFID of the gaming chips in the position for which the reading-out is desired can be read out and the identification information of the IC tags for use in RFID of the gaming chips in the position for which the reading-out is not desired is not read out can be made.

<<<Magnetic Field Generated by Antenna 200>>>

Each of FIG. 9 and FIG. 10 is a diagram illustrating a result of a simulation for showing a direction and an intensity of the magnetic field generated by the antenna 200. In each of FIG. 9 and FIG. 10, the direction of the magnetic field is illustrated by a direction of each long isosceles triangle. In other words, the direction of the magnetic field is a direction along a longitudinal direction of each isosceles triangle. In FIG. 9 and FIG. 10, each intensity of the magnetic field generated by the antenna 200 is indicated by hatching the isosceles triangles. Each white isosceles triangle having no hatching indicates that an intensity of the magnetic field is the strongest; each isosceles triangle having parallel lines indicated that an intensity of the magnetic field is slightly weak; and each isosceles triangle having hatching of crossed lines indicates that an intensity of the magnetic field is further weak. As described above, in FIG. 9 and FIG. 10, for clear and simplified indication, only three kinds of intensities are shown. However, the intensity of the magnetic field generated by the antenna 200 continuously varies depending on a position and a distance from the antenna 200.

As described above, the antenna 200 is constituted of the plurality of unit antennas 202. Accordingly, the magnetic field generated by the whole of the antenna 200 becomes a magnetic field in which magnetic fields generated by the plurality of respective unit antennas 202 are superposed. As a result of this superposition, both of magnetic field lines (integrated magnetic field lines) coiling on the whole of the antenna 200 and magnetic field lines (individual magnetic field lines) coiling through the respective unit antennas 202 are present.

A balance between the magnetic field lines coiling on the whole of the antenna 200 and the magnetic field lines coiling through the respective unit antennas 202 is changed depending on a distance between respective neighboring unit antennas 202 and a magnitude of the magnetic field (magnitude of the fed electric current).

In any case, it is only required that the magnetic field generated by the antenna 200 exerts the action on the antenna 310 of each of the gaming chips 300 and electromotive force needed to drive the IC tag 320 for use in RFID of each of the gaming chips 300 is generated.

It is only required that a part of the magnetic field lines of the magnetic field generated by the antenna 200 becomes magnetic field lines penetrating through the IC tags 320 for use in RFID in each of the chip storing grooves 106. In this case, when the penetration at a certain angle is made, the above-described reading-out is conducted. The above-mentioned magnetic field lines are generated in each of the chip storing grooves 106, thereby allowing the IC tags 320 for use in RFID of the plurality of gaming chips 300 juxtaposed in each of the chip storing grooves 106 to be read out.

FIG. 9 is a diagram illustrating a view of the magnetic field generated by the whole of the antenna 200, with a side view of the antenna 200 shown. FIG. 10 is a diagram illustrating a view of the magnetic field generated by the whole of the antenna 200, with the side view of the antenna 200 shown in an oblique direction.

As shown in FIG. 9 and FIG. 10, the magnetic field generated by the electric current flowing through the antenna 200 is formed so as to stride over the antenna 200. The magnetic field lines start from one terminal end portion 220a of the antenna 200, coil outside of the antenna 200, pass through the other terminal end portion 220b of the antenna 200, and return to the antenna 200 again.

Since the magnetic field coils into areas S1 and S2 in the vicinity of the two terminal end portions 220a and 220b of the antenna 200, it is likely that the areas S1 and S2 bring slight disadvantages in terms of the reading-out of the IC tags 320 for use in RFID. The area S1 is an area which corresponds to the first storage end portion 110 and the area S2 is an area which corresponds to the second storage end portion 112.

On the other hand, in an area S3 between the two terminal end portions 220a and 220b of the antenna 200, magnetic field lines in parallel with the longitudinal direction of the antenna 200 are formed, and the area S3 brings advantages in terms of the reading-out of the IC tags 320 for use in RFID. This area S3 is an area which corresponds to the chip juxtaposing part 108.

As described above, the magnitude of the magnetic field in the vicinity of the unit antennas 202 is large, and the magnitude of the magnetic field is decreased in accordance with the decrease in the proximity to the unit antennas 202. Similarly, a magnitude of the magnetic field in the vicinity of the antenna 200 is large, and the magnitude of the magnetic field is decreased in accordance with a decrease in the proximity to the antenna 200.

By appropriately determining a magnitude of the electric current fed to the antenna 200, the antenna 200 installed in one chip storing groove 106 can develop the electromotive force needed to drive the IC tags 320 for use in RFID of the gaming chips 300 stored in the one chip storing groove 106. On the other hand, it can be arranged that the antenna 200 installed in the one chip storing groove 106 does not develop electromotive force needed to drive the IC tags 320 for use in RFID of the gaming chips 300 stored in the other chip storing grooves 106 in the vicinity of the one chip storing groove 106. Therefore, the antenna 200 installed in the one chip storing groove 106 can read out identification information of the IC tags 320 for use in RFID of the gaming chips 300 stored in the one chip storing groove 106. However, the antenna 200 installed in the one chip storing groove 106 never reads out identification information of the IC tags 320 for use in RFID of the gaming chips 300 stored in the other chip storing grooves 106.

For example, the antenna 200a installed in the chip storing groove 106a can read out identification information of the IC tags 320 for use in RFID of the gaming chips 300 stored in the chip storing groove 106a.

In addition, in accordance with the number of the gaming chips 300 juxtaposed in the chip juxtaposing part 108, a length of the chip juxtaposing part 108 is determined. It is only required to determine a length of a longitudinal direction of the antenna 200 in accordance with the length of the chip juxtaposing part 108.

<<<Processing of Selection of Antenna 200>>>

FIG. 11 is a diagram illustrating an outline of a chip tray system having a first RF reader 700-1 and a second RF reader 700-2 of the chip tray 100. Here, the above-described antenna 200 is disposed in each of the above-described chip storing grooves 106.

As described above, the chip tray 100 has six tray units 104. In FIG. 11, among the six tray units 104, only a first tray unit 104-1 and a second tray unit 104-2 are shown, and the others are omitted.

The first tray unit 104-1 has: a first chip storing groove 106a-1; a second chip storing groove 106b-1; and a third chip storing groove 106c-1. In the first chip storing groove 106a-1, a first antenna 200a-1 is installed. In the second chip storing groove 106b-1, a second antenna 200b-1 is installed. In the third chip storing groove 106c-1, a third antenna 200c-1 is installed. Each of the first antenna 200a-1, second antenna 200b-1, and third antenna 200c-1 is the same as the above-described antenna 200. Each of the first chip storing groove 106a-1, second chip storing groove 106b-1, and third chip storing groove 106c-1 is also the same as the above-described chip storing groove 106.

Similarly, the second tray unit 104-2 has: a first chip storing groove 106a-2; a second chip storing groove 106b-2; and a third chip storing groove 106c-2. In the first chip storing groove 106a-2, a first antenna 200a-2 is installed. In the second chip storing groove 106b-2, a second antenna 200b-2 is installed. In the third chip storing groove 106c-2, a third antenna 200c-2 is installed. Each of the first antenna 200a-2, second antenna 200b-2, and third antenna 200c-2 is the same as the above-described antenna 200. Each of the first chip storing groove 106a-2, second chip storing groove 106b-2, and third chip storing groove 106c-2 is also the same as the above-described chip storing groove 106.

The first antenna 200a-1, second antenna 200b-1, and third antenna 200c-1 are electrically connected to a first antenna switching part 702-1 of the first RF reader 700-1. Similarly, the first antenna 200a-2, second antenna 200b-2, and third antenna 200c-2 are electrically connected to a second antenna switching part 702-2 of the second RF reader 700-2.

The first antenna switching part 702-1 is electrically connected to a first controller 704-1. The first antenna switching part 702-1 is controlled by the first controller 704-1. The second antenna switching part 702-2 is electrically connected to a second controller 704-2. The second antenna switching part 702-2 is controlled by the second controller 704-2.

Each of the first RF reader 700-1 and the second 700-2 reads out the identification information and the like stored in the IC tags 320 for use in RFID of the gaming chips 300 by wireless communications. Specifically, the first RF reader 700-1 can access the IC tags 320 for use in RFID (refer to FIG. 12) installed inside of the gaming chips 300 via the antennas 200a-1, 200b-1, and 200c-1. More specifically, through the wireless communications using the antennas 200a-1, 200b-1, and 200c-1, the first RF reader 700-1 reads out the variety of pieces of information stored in the IC tags 320 for use in RFID of the gaming chips 300.

The variety of pieces of information stored in the IC tags 320 for use in RFID include identification information of the chips. The identification information is information such as chip ID (for example, ID serial numbers) for identifying the gaming chips 300. As the IC tags 320 for use in RFID, rewritable ones are used. When each of the first RF reader 700-1 and the second 700-2 has a writing function, each of the first RF reader 700-1 and the second 700-2 can write desired information into the IC tags 320 for use in RFID. As described above, a variety of pieces of information can be stored in the IC tags 320 for use in RFID.

The first RF reader 700-1 has the controller 704-1 and a transmitting and receiving part 706-1. The transmitting and receiving part 706-1 is electrically connected to the controller 704-1. The controller 704-1 receives an instruction issued by a reader controller (not shown). The controller 704-1 drives the transmitting and receiving part 706-1 in accordance with the received instruction.

The transmitting and receiving part 706-1 is driven by the controller 704-1 and reads out identification information issued from the gaming chips 300. The controller 704-1 transmits the read identification information to the reader controller (not shown). The controller 704-1 is constituted of, for example, a microcomputer having a CPU, a ROM, and a RAM (not shown).

The transmitting and receiving part 706-1 has a function of wirelessly communicating with the IC tags 320 for use in RFID of the gaming chips 300 via the antennas 200a-1, 200b-1, and 200c-1. The transmitting and receiving part 706-1 has a modulation part 708-1 and a demodulation part 710-1. The transmitting and receiving part 706-1 is constituted of, for example, an RF module or the like having a modulation circuit and a demodulation circuit.

The modulation part 708-1 modulates a carrier wave through a predetermined modulation method based on the information such as a predetermined command, request, and instruction received from the controller 704-1, generates a modulation wave (modulation signal), and outputs the modulation wave as an RF signal. The outputted RF signal is supplied to each of the antennas 200a-1, 200b-1, and 200c-1 and is issued as an electromagnetic wave from each of the antennas 200a-1, 200b-1, and 200c-1.

The modulation wave received by each of the antennas 200a-1, 200b-1, and 200c-1 is supplied to the demodulation part 710-1 as the modulation signal. This modulation wave is an electromagnetic wave obtained by modulating the carrier wave through the predetermined modulation method based on data stored in the IC tags 320 for use in RFID in the gaming chips 300. The demodulation part 710-1 demodulates the modulation signal supplied from each of the antennas 200a-1, 200b-1, and 200c-1, takes out the data stored in the IC tags 320 for use in RFID, and transmits the data to the controller 704-1. Thus, the chip identification information stored in the IC tags 320 for use in RFID is sent to the controller 704-1.

Similarly, the second RF reader 700-2 has a controller 704-2 and a transmitting and receiving part 706-2. The transmitting and receiving part 706-2 has a function of wirelessly communicating with the IC tags 320 for use in RFID of the gaming chips 300 via the antennas 200a-2, 200b-2, and 200c-2. The transmitting and receiving part 706-2 has a modulation part 708-2 and a demodulation part 710-2. The transmitting and receiving part 706-2 is constituted of, for example, an RF module or the like having a modulation circuit and a demodulation circuit. The second RF reader 700-2 has the same configuration as that of the first RF reader 700-1 and functions in the same manner.

In addition, the controller 704-1 or 704-2 issues a selection control signal indicating an antenna to be selected to the first antenna switching part 702-1 or the second antenna switching part 702-2. The first antenna switching part 702-1 or the second antenna switching part 702-2 selects the antenna indicated by the received selection control signal. The information of an IC tag 320 for use in RFID is read out by the antenna selected by the first antenna switching part 702-1 or the second antenna switching part 702-2 and is supplied to the demodulation part of the transmitting and receiving part via the first antenna switching part 702-1 or the second antenna switching part 702-2.

The first controller 704-1 and the second controller 704-2 perform the control so as to simultaneously read out the antennas located at each predetermined distance from one another. For example, first, the first controller 704-1 and the second controller 704-2 perform the control so as to simultaneously read out the first antenna 200a-1 and the first antenna 200a-2. Next, the first controller 704-1 and the second controller 704-2 perform the control so as to simultaneously read out the second antenna 200b-1 and the second antenna 200b-2. Lastly, the first controller 704-1 and the second controller 704-2 perform the control so as to simultaneously read out the third antenna 200c-1 and the second antenna 200c-2.

In this example, it is arranged that the IC tags 320 for use in RFID of the gaming chips 300 placed in the chip storing grooves 106 of the first tray unit 104-1 and the second tray unit 104-2 can be read out in parallel with each other. In other words, the IC tags 320 for use in RFID of the gaming chips 300 placed in the same tray unit 104 are not read out.

As described above, the antennas located at the predetermined distance are simultaneously read out, thereby allowing the IC tags 320 for use in RFID to be read out by simultaneously using the plurality of antennas without causing disturbances such as interference and enabling time required for the reading-out to be shortened.

In the above-described example, the case where the electromotive force is developed on the IC tags 320 for use in RFID by the first antenna 200a-1, second antenna 200b-1, and third antenna 200c-1 as well as the first antenna 200a-2, second antenna 200b-2, and third antenna 200c-2 and the information such as the identification information is read out is shown. However, antennas for reading out the information such as the identification information may be separately installed. In this case, the antennas for reading the information such as the identification information can be installed in predetermined positions, for example, on a casino table. In this case, it is only required for the first antenna 200a-1, second antenna 200b-1, and third antenna 200c-1 as well as the first antenna 200a-2, second antenna 200b-2, and third antenna 200c-2 to satisfy conditions to develop the electromotive force needed to drive the IC tags 320 for use in RFID.

<<<Gaming Chips 300>>>

FIG. 12 is a block diagram showing a configuration of each of the gaming chips 300.

The gaming chips 300 are gaming media (storage media) used by dealers and players as a substitute for cash in a gaming house such as a casino. In general, the gaming chips 300 are media obtained by forming a resin or the like so as to be disc-like.

Each of the gaming chips 300 has an IC tag 320 for use in RFID embedded therein. The IC tag 320 for use in RFID has an IC chip 302 and an antenna 310. The IC chip 302 has a storage part 316 in addition to a controller 314 and a transmitting and receiving part 312.

The IC tag 320 for use in RFID has stored therein chip identification information which can be read out by a reading-out signal issued from RF readers (refer to the first RF reader 700-1 and the second RF reader 700-2 shown in FIG. 11). In addition, by using a rewritable IC tag, a desired variety of pieces of information can be written thereinto.

The controller 314 interprets commands, requests, instructions, and the like issued from the RF readers and executes operations in response thereto. The transmitting and receiving part 312 has a modulation part (not shown) and a demodulation part (not shown). The transmitting and receiving part 312 performs modulation and demodulation of signals to wirelessly transmit and receive the variety of pieces of information such as the identification information to and from the RF readers.

The antenna 310 can receive a modulation wave from an antenna device 100 connected to the RF readers.

When an intensity of an electromagnetic wave from the antenna device 100 is a predetermined intensity, electromotive force needed to drive the IC chip 302 can be developed via the antenna 310. The IC chip 302 for use in RFID is driven by the received electromagnetic wave, and the controller 314, the transmitting and receiving part 312, and the storage part 316 performs predetermined operations.

When power is fed to the controller 314 and the transmitting and receiving part 312 by the modulation wave and a resonance wave, and the controller 314 and the transmitting and receiving part 312 are thereby driven, the transmitting and receiving part 312 generates a modulation signal indicating information in accordance with a command, a request, or an instruction issued from the RF readers, for example, chip identification information. The antenna 310 receives the modulation signal generated by the transmitting and receiving part 312 and transmits the modulation wave indicating the chip identification information. At HF, in general, communications are performed from each of the gaming chips 300 (IC chips) to the RF readers through load modulation.

The signal transmitted from the antenna 310 is received by the above-described antenna device 100 and supplied to the RF readers. Thus, the RF readers can read out the chip identification information stored in each of the IC tags 320 for use in RFID.

In the vicinity of the antenna 310, magnetic field components become dominant. In the HF band, the antenna 310 is also the so-called loop antenna or spiral antenna and an antenna obtained by forming a lead wire to be ring-like (loop-shaped). For example, the loop antenna has a shape formed such that a leading end and a terminal end thereof are located in the same position. The spiral antenna has a shape formed so as to increase the number of turns of the loop antenna. It is preferable that the turns of the antenna 310 are formed so as to be included within one plane, that is, the antenna 310 is formed to be flat.

In the antenna 310, a coiling part of the antenna 310 is formed by a coiling lead wire. In other words, it is only required for the antenna 310 to generate a magnetic field having a predetermined direction and a predetermined magnitude by coiling a direction of an electric current passing through the lead wire. The coiling shape may be a shape coiling in a circular manner or a shape coiling in a rectangular manner. The magnetic field generated by the antenna 200 exerts the action on the coiling part of the antenna 310, whereby the antenna 310 develops the electromotive force. When the magnitude of the electromotive force developed by the antenna 310 is greater than or equal to a magnitude needed to drive each of the IC tags 320 for use in RFID, each of the IC tags 320 for use in RFID can be driven.

Each of the IC tags 320 for use in RFID is coated with a resin, and gaming chips 300 each having a disc-like shape are formed.

As shown in FIG. 4, the lead wire of which the antenna 310 is formed is disposed so as to coil inside of each of the gaming chips 300. The antenna 310 is disposed so as to coil inside of each of the gaming chips 300, whereby even when the magnetic field generated by the antenna 200 reaches the outermost periphery of each of the gaming chips 300, no electromotive force is developed. The magnetic field having the needed intensity covers a large part of the antenna 310 for use in RFDI inside of each of the gaming chips 300, thereby allowing the electromotive force needed to drive the IC tag 320 for use in RFID to be developed.

As described above, the antenna 200 according to the first embodiment is coiled to be arc-like and formed to be helical, having a shape similar to that of a helical antenna as a whole. In other words, since the facing part 204 is formed to be arc-like, as shown in FIG. 4, the antenna 200 can be disposed such that the facing parts 204 are disposed along the antenna disposition face 122. Therefore, without making the electric current fed to the antenna 600 large, the antenna 200 can efficiently generate the magnetic field penetrating through the antennas 310 the IC tags 320 for use in RFID.

Second Embodiment

Figure 13:
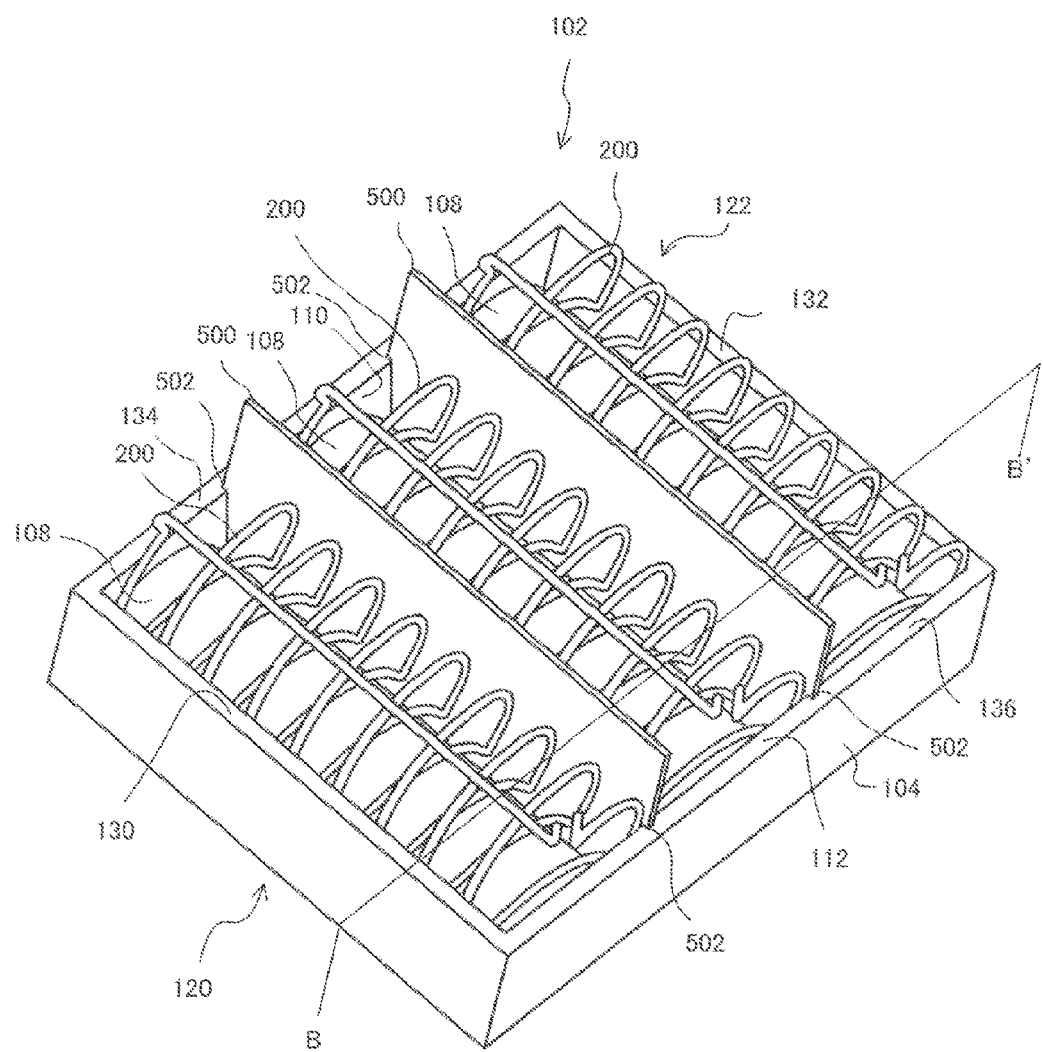
FIG. 13 is an outline perspective view of a chip tray 100' according to a second embodiment.
Figure 14:
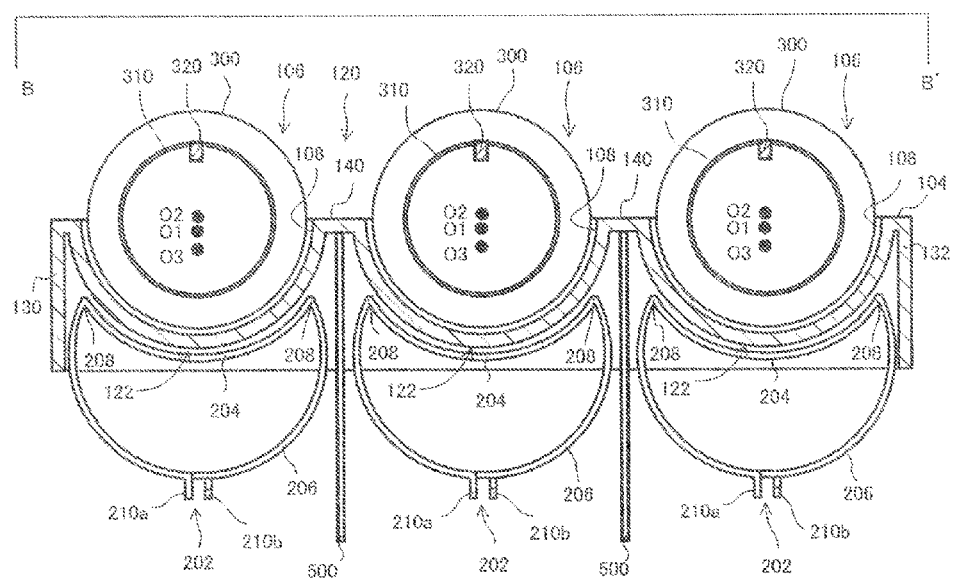
FIG. 14 is a sectional front view of the chip tray 100', taken from a line B-B' in the second embodiment.

FIG. 13 is a perspective view of a back side of a chip tray 100' according to a second embodiment. FIG. 14 is a sectional front view, taken from a line B-B' in FIG. 13.

<<<<Configuration of Chip Tray 100'>>>>

A chip tray structure 102 of the chip tray 100' has a plurality (two magnetic shielding plates in the present embodiment) of magnetic shielding plates 500 (500a and 500b). When it is not particularly necessary to distinguish the magnetic shielding plates 500a and 500b, the magnetic shielding plates 500a and 500b are simply referred to as magnetic shielding plates 500.

The chip tray 100' according to the second embodiment has a configuration similar to that of the chip tray 100 according to the first embodiment except that the magnetic shielding plates 500a and 500b are provided. In the description and drawings of the chip tray 100' according to the second embodiment, the same components as those of the chip tray 100 according to the first embodiment are denoted with the same reference numerals and symbols as those of the chip tray 100 according to the first embodiment. Accordingly, except for a function performed by the later-described magnetic shielding plates 500a and 500b, the components denoted with the same reference numerals and symbols have the same configurations as those of the first embodiment and function in the same manner as in the first embodiment. Therefore, in the description of the chip tray 100' according to the second embodiment, the description of the components denoted with the same reference numerals and symbols is omitted.

More specifically, the configuration and function of the antenna 200 and the configuration and function of each of the gaming chips 300 are the same as those in the first embodiment. The magnetic field generated from the antenna 200 exerts the action on the antennas 310 of the gaming chips 300, thereby allowing the identification information to be read out from the IC tags 320 for use in RFID of the gaming chips 300.

<<Magnetic Shielding Plates 500>>

The magnetic shielding plates 500 are formed of, for example, a material such as copper foil and a metal plate. Each of the magnetic shielding plates 500 has a long rectangular shape. As shown in FIG. 13 and FIG. 14, the magnetic shielding plates 500 are provided to stand on the partition parts 140a and 140b.

Each of the magnetic shielding plates 500 is disposed such that a first side in a short direction comes into contact with the first wall part 130 and a second side in a short direction comes into contact with the second wall part 132. In the central portion of the short side of each of the magnetic shielding plates 500, a latch part 502 having an uneven shape is formed. Each of the magnetic shielding plates 500 can be engaged and stopped in the first wall part 130 and the second wall part 132 by the latch part 502. In the specification, "to latch" means "to stop in a manner in which a plurality of members are engaged."

Each of the magnetic shielding plates 500a is provided on a back side of the partition part 140a. Specifically, the magnetic shielding plate 500a is provided in a position sandwiched between the chip storing groove 106a and the chip storing groove 106b. Accordingly, the magnetic shielding plate 500a extends between the chip storing groove 106a and the chip storing groove 106b. Similarly, the magnetic shielding plate 500b is provided on a back side of the partition part 140b. Specifically, the magnetic shielding plate 500b is provided in a position between the chip storing groove 106b and the chip storing groove 106c. The magnetic shielding plate 500b extends between the chip storing groove 106b and the chip storing groove 106c.

The magnetic shielding plate 500a is provided between the antenna 200a and the antenna 200b. The magnetic shielding plate 500b is provided between the antenna 200b and the antenna 200c.

The magnetic field generated by the antenna 200a is hindered by the magnetic shielding plate 500a. Accordingly, the magnetic field generated by the antenna 200a does not stretch to the chip storing grooves 106 such as the chip storing groove 106b and the chip storing groove 106c. Therefore, it can be prevented by the magnetic field generated by the antenna 200a that identification information or the like is read out from the IC tags 320 for use in RFID of the gaming chips 300 juxtaposed in the chip storing groove 106b and the chip storing groove 106c.

Similarly, the magnetic field generated by each of the antenna 200b and the antenna 200c is also hindered by each of the magnetic shielding plate 500a and the magnetic shielding plate 500b. As described above, by providing the magnetic shielding plates 500, it can be prevented that the antenna 200 reads out the identification information from the IC tags 320 for use in RFID of the gaming chips 300 juxtaposed in the neighboring chip storing grooves 106.

The shape and the size of each of the magnetic shielding plates 500 may be appropriately changed. The latch part 502 is provided on each of the magnetic shielding plates 500. However, the magnetic shielding plates 500 may be engaged and stopped by employing other method.

In the second embodiment, the same antenna 200 as that in the first embodiment is used. As described above, the antenna 200 is formed so as to be curved to be arc-like and to be helical and has a shape similar to the helical antenna as a whole. In other words, since each of the facing parts 204 is formed to be arc, as shown in FIG. 4, the antenna 200 can be disposed with the facing parts 204 along the antenna disposition face 122. Therefore, also in the second embodiment, as with the first embodiment, the antenna 200 efficiently generates the magnetic field penetrating through the antennas 310 of the IC tags 320 for use in RFID without making the electric current fed to the antenna 600 large.

As described above, in the configuration of the second embodiment, the magnetic shielding plates 500 are provided. Therefore, even when the electric current fed to the antenna 600 is made large and a magnetic field having a large intensity is generated, the interference caused on the surroundings can be prevented by the magnetic shielding plates 500. Thus, the chip tray 100' according to the second embodiment can be used in a widened range of conditions and be thereby made easy-to-use.

Third Embodiment

Figure 15:
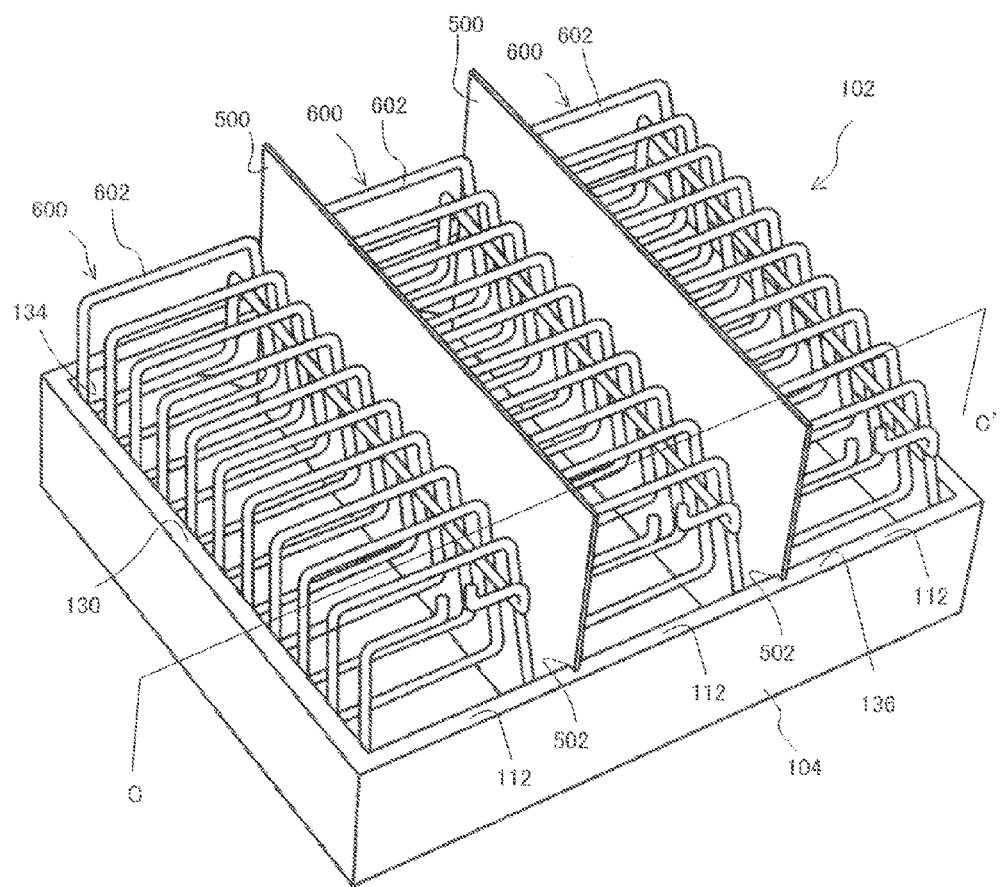
FIG. 15 is an outline perspective view of a chip tray 100'' according to a third embodiment.
Figure 16:
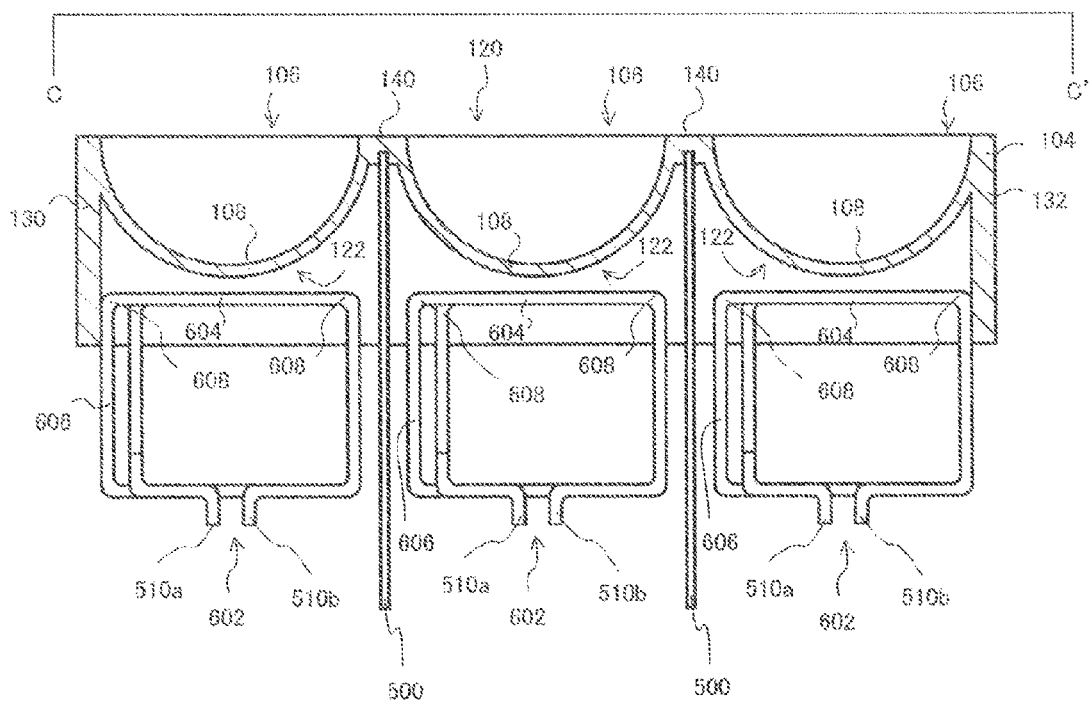
FIG. 16 is a sectional front view, taken from a line C-C' in the third embodiment.

FIG. 15 is a perspective view of a back side of a chip tray 100" according to a third embodiment. FIG. 16 is a sectional front view, taken from a line C-C' in FIG. 15.

<<<<Configuration of Chip Tray 100">>>>

In the chip tray 100", a plurality (three antennas in the present embodiment) of antennas 600 (600a, 600b, and 600c) are provided. In addition, when it is not particularly necessary to distinguish the antennas 600a, 600b, and 600c, the antennas 600a, 600b, and 600c are simply referred to as antennas 600.

As with the second embodiment, each of the magnetic shielding plates 500 is provided between the antennas 600. Specifically, the magnetic shielding plate 500a is provided between the antenna 600a and the antenna 600b. The magnetic shielding plate 500b is provided between the antenna 600b and the antenna 600c. Thus, it can be prevented that the antenna 600 reads out identification information from the IC tags 320 for use in RFID of the gaming chips 300 juxtaposed in the neighboring chip storing grooves 106.

The chip tray 100" according to the third embodiment has the same configuration as that of the chip tray 100 according to the first embodiment except that the antennas 600 and the magnetic shielding plates 500a and 500b are provided. In the description and drawings of the chip tray 100" according to the third embodiment, the same components as those of the chip tray 100 according to the first embodiment are denoted with the same reference numerals and symbols as those of the chip tray 100 according to the first embodiment. Accordingly, except for a function performed by the later-described magnetic shielding plates 500a and 500b, the components denoted with the same reference numerals and symbols have the same configurations as those of the first embodiment and function in the same manner as in the first embodiment. Therefore, in the description of the chip tray 100" according to the third embodiment, the description of the components denoted with the same reference numerals and symbols is omitted.

In the chip tray 100" according to the third embodiment, the antennas 600 are provided, instead of the antennas 200. Although each of the antennas 600 has a contour different from that of each of the antennas 200, in terms of the generation of the magnetic field, the antennas 600 are similar to the antennas 200. The magnetic field generated from each of the antennas 600 exerts the action on the antennas 310 of the gaming chips 300, thereby allowing identification information to be read out from the IC tags 320 for use in RFID of the gaming chips 300.

<<Antennas 600>>

As shown in FIG. 15, each of the antennas 600 of the chip tray 100" according to the third embodiment is a coil formed in a three-dimensional manner and has a shape formed by bending and coiling a single lead wire at a plurality of times in a spiral manner and a coaxial manner. Each of the antennas 600 has a shape obtained by bending a lead wire at right angles each per predetermined length. A cross-section of each of the antennas 600 has a rectangular shape. Accordingly, each of the antennas 600 has a quadratic prism formed by faces including each of the antennas 600 as a whole. Each of the antennas 600 has a long shape along a coaxial direction. Each of the antennas 600 has a long shape as a whole, which is similar to a shape of the so-called solenoid and helical antenna. As described above, each of the antennas 600 is formed so as to have the long shape as a whole, thereby allowing each of the antennas 600 to be disposed on the antenna disposition face 122 of the chip juxtaposing part 108. More specifically, each of the antennas 600 can be disposed on the antenna disposition face 122 along the juxtaposing direction (stacking direction) of the chip juxtaposing part 108.

It is preferable that the antennas 600 are formed of a material, for example, metal such as copper and aluminum, which has a low resistance value. As the material of the antennas 600, it is only required to be capable of allowing an electric current to efficiently pass therethrough and generating the magnetic field.

Each of the antennas 600 in the third embodiment is disposed on the antenna disposition face 122 of the chip juxtaposing part 108. Further, each of the antennas 600 is disposed such that a longitudinal direction of each of the antennas 600 is in parallel with the longitudinal direction (or a juxtaposing direction or a stacking direction) of the chip juxtaposing part 108. Each of the antennas 600 is disposed between the first storage end portion 110 and the second storage end portion 112. Accordingly, in the third embodiment, as with the first embodiment, each of the antennas 600 is not extended to side portions of the first storage end portion 110 and the second storage end portion 112. In order to adjust magnitudes and directions (shapes of magnetic field lines) of magnetic fields in the vicinity of the first storage end portion 110 and the second storage end portion 112, a configuration in which each of the antennas 600 is extended to the side portions of the first storage end portion 110 and the second storage end portion 112 may be employed.

Even in the case where each of the antennas 600 is extended to the side portions of the first storage end portion 110 and the second storage end portion 112, each of the antennas 600 is not present in directions along the first storage end portion 110 and the second storage end portion 112 (back sides of the first storage end portion 110 and the second storage end portion 112).

Specifically, an antenna 600a is disposed in the antenna disposition face 122 of the chip juxtaposing part 108 along a longitudinal direction of a chip storing groove 106a. An antenna 600b is disposed in the antenna disposition face 122 of the chip juxtaposing part 108 along a longitudinal direction of a chip storing groove 106b. An antenna 600c is disposed in the antenna disposition face 122 of the chip juxtaposing part 108 along a longitudinal direction of a chip storing groove 106c.

Each of the antennas 600 in the third embodiment is disposed so as to be extended across the side portion of the chip juxtaposing part 108 along the longitudinal direction of the chip juxtaposing part 108. Therefore, the configuration of the third embodiment is different from a configuration of the conventional chip tray in which an antenna is disposed along faces of the first storage end portion 110 and the second storage end portion 112.

As described above, in the chip tray 100", the three chip storing grooves 106a, 106b, and 106c are formed so as to be in parallel with one another. Accordingly, the antennas 600a, 600b, and 600c displaced in the chip storing grooves 106a, 106b, and 106c are also disposed so as to be in parallel with one another.

The RF readers (refer to FIG. 11) are electrically connected to each of the antennas 600 in the third embodiment. When RF signals are outputted from the RF readers, magnetic fields having predetermined magnitudes are generated inside and outside of each of the antennas 600. Through wireless communications using each of the antennas 600, the RF readers read out a variety of information such as identification information stored in a storage part 316 of the IC tag 320 for use in RFID of each of the gaming chips 300.

<<Unit Antennas 602>>

Each of the antennas 600 has a plurality of unit antennas 602. Each of the unit antennas 602 is an antenna formed to be loop-like. Specifically, each of the unit antennas 602 is constituted of one facing part 604 and one connecting part 606. Each of the unit antennas 602 is a lead wire portion of a minimum unit, and the antenna 600 is constituted of the unit antennas 602. Each of the antennas 600 has a configuration in which the facing parts 604 and the connecting part 606s are formed in an alternately repeated manner. The unit antennas 602 correspond to coiling parts of a magnetic field generating antenna.

The magnetic field generated by the unit antennas 602 penetrates through the IC tags 320 for use in RFID of the gaming chips 300 in corresponding positions. The magnetic field penetrated therethrough develops electromotive force on the IC tags 320 for use in RFID. The identification information is outputted by the electromotive force from the IC tags 320 for use in RFID, and the identification information can be read out by the magnetic field generated by the unit antennas 602.

<Facing Part 604>

Each of the facing parts 604 has a linear shape. The facing parts 604 are disposed so as to face toward the antenna disposition face 122 of the chip juxtaposing part 108. The facing parts 604 are disposed so as to be positioned toward the chip juxtaposing part 108 (so as to face the chip juxtaposing part 108). More specifically, the facing parts 604 are disposed so as to be positioned toward the chip juxtaposing part 108 (so as to face the chip juxtaposing part 108) in a direction perpendicular to the juxtaposing direction in which the gaming chips 300 are juxtaposed.

These facing parts 604 correspond to one part of the coiling parts of the magnetic field generating antenna for generating the magnetic fields. As described above, the facing parts 604 are disposed in the direction perpendicular to the juxtaposing direction in which the gaming chips 300 are juxtaposed. As described below, the antennas 310 are disposed in parallel with the gaming chips 300. Accordingly, the facing parts 604 are disposed in parallel with the antennas 310 installed in the gaming chips 300. Each of the facing parts 604 is formed so as to be short with respect to each of the later-described connecting parts 606 and each of the facing parts 604 is disposed substantially in parallel with each of the antennas 310.

<Connecting Part 606>

Each of the connecting parts 606 has a U-shape. The connecting parts 606 electrically connect two neighboring facing parts 604. Each of the facing parts 604 and each of the connecting parts 606 are electrically connected to each other at a bending part 608. In other words, each of the facing parts 604 and each of the connecting parts 606 are electrically connected via the bending part 608.

Each of the connecting parts 606 is disposed in a position more away from the chip juxtaposing part 108 than each of the facing parts 604 is away therefrom. More specifically, each of the connecting parts 606 is disposed in the position more away from the chip juxtaposing part 108 than each of the facing parts 604 is away therefrom so as to be positioned toward the chip juxtaposing part 108 (so as to face the chip juxtaposing part 108) in a direction perpendicular to the juxtaposing direction in which the gaming chips 300 are juxtaposed.

In the third embodiment, the case where each of the antennas 600 is formed by bending and coiling one lead wire is described. However, a plurality of facing parts 604 and connecting parts 606 may be formed and electrically connected to each other, respectively. In any case, it is only required to integrally form each of the antennas 600 as a whole.

When the facing parts 604 are installed on the antenna disposition face 122 of the chip juxtaposing part 108, the facing parts 604 are disposed on the antenna disposition face 122 of the chip juxtaposing part 108 such that a central axis of each of the facing parts 604 is substantially in parallel with a central axis O2 of the chip juxtaposing part 108. It is only required that by using a bonding member such as an adhesive and screws, the antenna 600 is installed in each of the chip storing grooves 106.

<<Magnetic Field (Magnetic Field Lines)>>

Figure 17:
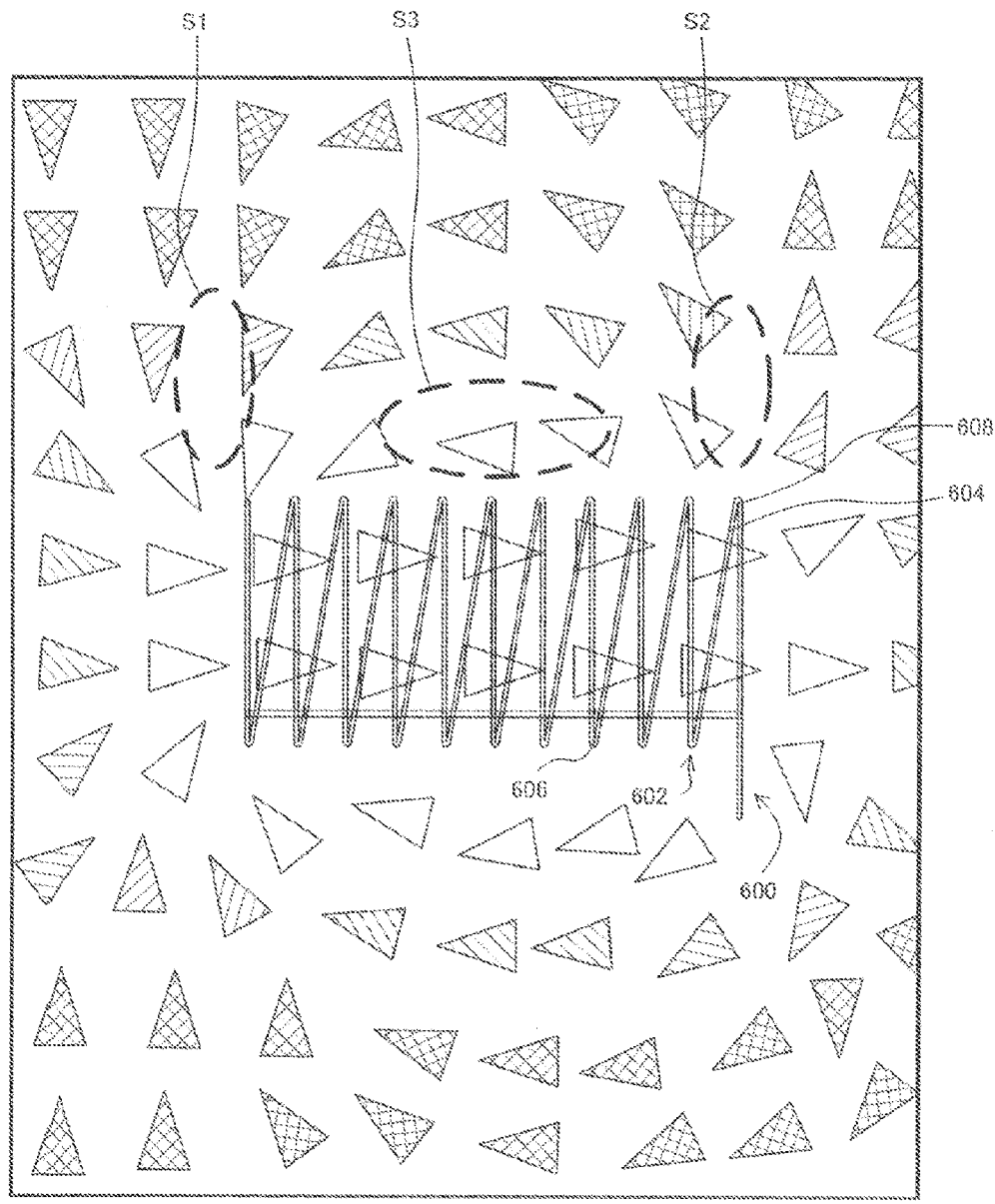
FIG. 17 is a diagram illustrating a result of a simulation for showing a direction and an intensity of a magnetic field generated by an antenna 600.

FIG. 17 is a diagram illustrating magnetic field lines formed by the whole of each of the antennas 600. As described above, each of the antennas 600 is constituted of the plurality of unit antennas 602. Accordingly, the magnetic field generated by the whole of each of the antennas 600 becomes a magnetic field in which magnetic fields generated by the plurality of respective unit antennas 602 are superposed. As a result of this superposition, both of magnetic field lines coiling on the whole of each of the antennas 600 and magnetic field lines coiling through the respective unit antennas 602 are present.

When a distance between the neighboring unit antennas 602 is short (coiling portions are densely formed), a larger number of magnetic field lines coiling on the whole of each of the antennas 600 than a number of magnetic field lines coiling through the respective unit antennas 602 are formed by the superposition. On the other hand, the distance between the neighboring unit antennas 602 is long (coiling portions are sparsely formed), a smaller number of magnetic field lines coiling on the whole of each of the antennas 600 than a number of magnetic field lines coiling through the respective unit antennas 602 are formed by the superposition. Even when the distance between the neighboring unit antennas 602 is short, it is only required to be capable of forming the magnetic field lines penetrating through the IC tags 320 for use in RFID and developing the electromotive force needed to drive the IC tags 320 for use in RFID.

It is only required that a part of the magnetic field lines of the magnetic field generated by each of the antennas 600 becomes magnetic field lines penetrating through the IC tags 320 for use in RFID in each of the chip storing grooves 106. The above-mentioned magnetic field lines are generated in each of the chip storing grooves 106, thereby allowing the IC tags 320 for use in RFID of the plurality of gaming chips 300 juxtaposed in each of the chip storing grooves 106 to be read out.

FIG. 17 is a diagram showing a result of calculating a view of the magnetic field generated by the whole of each of the antennas 600 using a electromagnetic field simulator. As in FIG. 9 and FIG. 10, in FIG. 17, the direction of the magnetic field is illustrated by a direction of each long isosceles triangle. In other words, the direction of the magnetic field is a direction along a longitudinal direction of each isosceles triangle. Also in FIG. 17, each intensity of the magnetic field generated by each of the antennas 600 is indicated by hatching the isosceles triangles. Each white isosceles triangle having no hatching indicates that an intensity of the magnetic field is the strongest; each isosceles triangle having parallel lines indicated that an intensity of the magnetic field is slightly weak; and each isosceles triangle having hatching of crossed lines indicates that an intensity of the magnetic field is further weak. Also in FIG. 17, for clear and simplified indication, only three kinds of intensities are shown. However, the intensity of the magnetic field generated by each of the antennas 600 continuously varies depending on a position and a distance from each of the antennas 600.

The magnetic field generated by the electric current flowing through each of the antennas 600 is formed so as to stride over each of the antennas 600. The magnetic field lines start from one terminal end portion 620a of each of the antennas 600, coil outside of each of the antennas 600, pass through the other terminal end portion 620b of each of the antennas 600, and return to the antenna 600 again. Inside and in the vicinity of the antenna 600, an intensity of the magnetic field is large. In addition, in accordance with a decrease in the proximity from the antenna 600, the intensity of the magnetic field is decreased.

By appropriately determining a magnitude of the electric current fed to the antenna 600, the antenna 600 installed in one chip storing groove 106 can develop electromotive force needed to drive the IC tags 320 for use in RFID of the gaming chips 300 stored in one chip storing groove 106.

An antenna 600a installed in a chip storing groove 106a can read out identification information of the IC tags 320 for use in RFID of the gaming chips 300 stored in the chip storing groove 106a. On the other hand, the antenna 600a installed in the chip storing groove 106a does not read out identification information of the IC tags 320 for use in RFID of the gaming chips 300 stored in the chip storing grooves 106b and 106c.

As described above, the antenna 600 according to the third embodiment has the shape obtained by bending the lead wire at the right angles each per predetermined length and forming the lead wire to be helical and has the substantially quadratic prism as a whole. As described above, the antenna 600 is formed to be the substantially quadratic prism as a whole, thereby allowing the antenna 600 to be easily formed and facilitating the arrangement of the antenna 600 in the tray unit 104 and thus enabling the assembly of the chip tray 100" to be made easy.

Since the facing part 604 is formed to be linear, as shown in FIG. 16, a portion away from the antenna disposition face 122 results. In other words, as compared with the facing part 204 of the antenna 200 having the arc shape, the portion away from the antenna 310 of each of the IC tags 320 for use in RFID is made large. Therefore, it is required to increase the electric current fed to the antenna 600 and increase the intensity to generate the magnetic field, thereby easily causing the interference in the surroundings. Therefore, in the third embodiment, it is preferable that the magnetic shielding plates 500 are provided along the longitudinal direction of the antenna 600, thereby preventing the interference.

In the third embodiment, the case where the magnetic shielding plates 500 are provided is described. However, no magnetic shielding plates 500 may be provided.

In this case, a density and a size of the unit antennas 602 and a magnitude of the electric current fed to the antenna 600 are appropriately changed in order to cope therewith.

Other Variations

In the above described embodiments, the case where the one antenna 200 is provided for the one chip storing groove 106 is described. However, the one antenna 200 may be provided for a plurality of chip storing grooves 106. For example, the one antenna 200 may be provided for three chip storing grooves 106. Specifically, the one antenna 200 may be provided for one tray unit 104. Thus, all IC tags 320 for use in RFID of gaming chips 300 stored in the one tray unit 104 can be read out through processing conducted once, thereby allowing the processing to be simplified.

In the above-described embodiment, the case where the antenna 200 is formed by the single lead wire is described. However, a pattern of a lead wire may be etched on a flexible printed circuit board or the like and the flexible printed circuit board may be installed in the chip tray structure 102. Thus, the antenna 200 can be made thinner and a process of manufacturing the antenna 200 can be simplified.

In the above-described embodiment, the case where all of the facing parts 204 and the connecting parts 206 are disposed on the backside (antenna disposition face 122) of the tray unit 104 is described. However, at least one part of the facing parts 204 and the connecting parts 206 may be disposed on an upper side (chip juxtaposing face 120) of the tray unit 104. Thus, antennas 200 and 600 can be installed so as to increase the proximity to the gaming chips 300 and a magnitude of the magnetic field generated by each of the antennas 200 and 600 can be decreased.

REFERENCE SIGNS LIST 100, 100', 100" chip tray (token storage device 10)
102 chip tray structure
106 chip storing groove (storage part 16)
108 chip juxtaposing part (juxtaposing part 18)
110 first storage end portion
112 second storage end portion
200, 600 antenna (magnetic field generating antenna 40)
202, 602 unit antenna (coiling part 42)
204, 604 facing part (one portion 44 of a coiling part 42)
300 gaming chip (token 30)
302 IC chip for use in RFID
320 IC tag for use in RFID
310 antenna (feeder antenna 32)
318 coiling part (coiling part 34)
500 shielding plate

What is claimed is:

1. A token storage device comprising:
    a storage part for storing in a stacked manner a plurality of tokens having feeder antennas of IC tags for use in RFID embedded therein; and
    a magnetic field generating antenna being disposed along a direction in which the tokens are stacked so as to develop electromotive force by exerting a magnetic field on the feeder antennas,
    wherein a part of each coiling part of the magnetic field generating antenna for generating the magnetic field by coiling an electric current is disposed in parallel with a part of a coiling part of the feeder antenna so as to face the part of the coiling part of the feeder antenna.

2. The token storage device according to claim 1, wherein a storage bottom face of the storage part for storing the plurality of tokens in the stacked manner is formed so as to be inclined.

3. The token storage device according to claim 1, wherein a plurality of coiling parts of the magnetic field generating antenna are disposed in the direction in which the tokens are stacked, and
    a distance between neighboring coiling parts of the magnetic field generating antenna is larger than a distance between the feeder antennas embedded in the tokens, with the feeder antennas being stacked.

* * * * *